(12) United States Patent
Alaniz et al.

(10) Patent No.: US 12,524,716 B2
(45) Date of Patent: Jan. 13, 2026

(54) OPERATIONS MANAGEMENT NETWORK SYSTEM AND METHOD

(71) Applicant: Schlumberger Technology Corporation, Sugar Land, TX (US)

(72) Inventors: Ivan Alaniz, McAllen, TX (US); Jan Dolejsi, Gatwick (GB); Jonathan Wun Shiung Chong, Richmond, TX (US); Dhananjay Raju, Anupuram (IN); Vladimir Lifschitz, Austin, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 318 days.

(21) Appl. No.: 16/412,479

(22) Filed: May 15, 2019

(65) Prior Publication Data
US 2019/0354911 A1 Nov. 21, 2019

Related U.S. Application Data

(60) Provisional application No. 62/671,760, filed on May 15, 2018.

(51) Int. Cl.
G06Q 10/0631 (2023.01)
E21B 43/26 (2006.01)

(52) U.S. Cl.
CPC .......... *G06Q 10/06313* (2013.01); *G06Q 10/063114* (2013.01); *G06Q 10/063118* (2013.01); *G06Q 10/06316* (2013.01); *E21B 43/2607* (2020.05)

(58) Field of Classification Search
CPC ..... G06Q 10/06313; G06Q 10/063114; G06Q 10/063118; G06Q 10/06316
See application file for complete search history.

(56) References Cited

U.S. PATENT DOCUMENTS 4,642,782 A 2/1987 Kemper et al.
6,516,891 B1 2/2003 Dallas
(Continued)

FOREIGN PATENT DOCUMENTS

CN 101809538 8/2010
CN 102289347 A 12/2011
(Continued)

OTHER PUBLICATIONS

Verfaillie, A timeline, event, and constraint-based modeling framework for planning and scheduling problems, Jun. 10, 2013, https://icaps13.icaps-conference.org/wp-content/uploads/2013/05/keps13-proceedings.pdf#page=62, p. 61-68.*
(Continued)

*Primary Examiner* — Jerry O'Connor
*Assistant Examiner* — James Webb
(74) *Attorney, Agent, or Firm* — Jeffrey D. Frantz

(57) ABSTRACT

Methods for operating wellsites utilized supplies from supply sites. For each wellsite, wellsite inputs for wellsite status, wellsite goals, and rate of consumption of supplies to attain the wellsite goals can be provided. For each supply site, supply site inputs for inventory of supplies, logistics of supply chain, and logistics of re-supply can be provided. Based on the inputs, an efficient detailed plan can be generated to include actions to be taken and corresponding times. The detailed plan can be provided as a schedule to permit stewarding or accomplishment of each action at each corresponding time. Also disclosed are non-transitory, computer readable media, computer systems, and systems for implementing the methods.

18 Claims, 7 Drawing Sheets

(56) References Cited

U.S. PATENT DOCUMENTS

| | | | |
|---|---|---|---|
| 8,738,414 B1 | 5/2014 | Nagar et al. | |
| 8,775,347 B2 | 7/2014 | Goel et al. | |
| 8,914,268 B2 | 12/2014 | Dale et al. | |
| 8,914,300 B2 | 12/2014 | Sustaeta | |
| 9,015,093 B1 | 4/2015 | Commons | |
| 9,396,181 B1 | 7/2016 | Sripada et al. | |
| 9,665,090 B2 | 5/2017 | Loganathan et al. | |
| 9,805,316 B2 | 10/2017 | Nettleton | |
| 10,268,453 B1 | 4/2019 | Ong et al. | |
| 10,740,730 B2* | 8/2020 | Altamirano | G06Q 30/06 |
| 11,423,493 B2* | 8/2022 | Fox | G06Q 10/00 |
| 2002/0049575 A1* | 4/2002 | Jalali | E21B 43/00 703/10 |
| 2002/0062156 A1 | 5/2002 | Yamakawa et al. | |
| 2003/0208392 A1* | 11/2003 | Shekar | G06Q 10/06312 705/7.22 |
| 2004/0078778 A1 | 4/2004 | Leymann et al. | |
| 2004/0088115 A1 | 5/2004 | Guggari et al. | |
| 2005/0209836 A1 | 9/2005 | Klumpen et al. | |
| 2005/0209912 A1 | 9/2005 | Veeningen et al. | |
| 2005/0278303 A1 | 12/2005 | Ruml | |
| 2007/0043607 A1 | 2/2007 | Howard | |
| 2007/0198223 A1 | 8/2007 | Ella et al. | |
| 2007/0299711 A1 | 12/2007 | Lundberg | |
| 2008/0275594 A1 | 11/2008 | de Guzman | |
| 2008/0281525 A1 | 11/2008 | Boone | |
| 2008/0294387 A1 | 11/2008 | Anderson et al. | |
| 2008/0300708 A1 | 12/2008 | Ruml et al. | |
| 2008/0306803 A1 | 12/2008 | Vaal et al. | |
| 2009/0132458 A1 | 5/2009 | Edwards et al. | |
| 2009/0152005 A1 | 6/2009 | Chapman et al. | |
| 2009/0265110 A1 | 10/2009 | Narayanan et al. | |
| 2010/0100409 A1* | 4/2010 | Rahi | G06Q 50/02 705/30 |
| 2010/0299172 A1* | 11/2010 | Nottoli | G06Q 10/06 705/7.18 |
| 2010/0306149 A1 | 12/2010 | Baum | |
| 2011/0082717 A1 | 4/2011 | Saad | |
| 2011/0155463 A1 | 6/2011 | Khromov et al. | |
| 2011/0238458 A1 | 9/2011 | Purcell et al. | |
| 2011/0251932 A1 | 10/2011 | Early et al. | |
| 2012/0054246 A1 | 3/2012 | Fischer | |
| 2012/0096463 A1 | 4/2012 | Agarwal et al. | |
| 2012/0166967 A1 | 6/2012 | Deimbacher et al. | |
| 2012/0185286 A1 | 7/2012 | Do | |
| 2013/0124249 A1 | 5/2013 | de Leon | |
| 2013/0231787 A1 | 9/2013 | Chapman et al. | |
| 2014/0007097 A1 | 1/2014 | Chin et al. | |
| 2014/0208253 A1 | 7/2014 | Pettus et al. | |
| 2014/0214469 A1 | 7/2014 | Callow et al. | |
| 2014/0237487 A1 | 8/2014 | Prasanna et al. | |
| 2014/0246238 A1 | 9/2014 | Abbassian et al. | |
| 2015/0073715 A1 | 3/2015 | Aarre | |
| 2015/0193711 A1 | 7/2015 | Lavrov et al. | |
| 2015/0278734 A1 | 10/2015 | Grant et al. | |
| 2016/0026940 A1 | 1/2016 | Johnson | |
| 2016/0075019 A1 | 3/2016 | Tabuchi et al. | |
| 2016/0189318 A1 | 6/2016 | Hein et al. | |
| 2016/0252897 A1 | 9/2016 | Ashok et al. | |
| 2016/0253634 A1* | 9/2016 | Thomeer | G06Q 10/06316 702/6 |
| 2016/0326846 A1 | 11/2016 | Rashid et al. | |
| 2016/0356125 A1 | 12/2016 | Bello et al. | |
| 2016/0358120 A1* | 12/2016 | Moore | G06Q 10/08 |
| 2017/0152728 A1 | 6/2017 | Abou-Sayed et al. | |
| 2017/0249574 A1 | 8/2017 | Knijnik et al. | |
| 2017/0277203 A1 | 9/2017 | Castillo-Effen et al. | |
| 2017/0293994 A1 | 10/2017 | Li et al. | |
| 2017/0370191 A1 | 12/2017 | Fox et al. | |
| 2018/0012310 A1 | 1/2018 | Fox et al. | |
| 2018/0032928 A1 | 2/2018 | Li et al. | |
| 2018/0075544 A1* | 3/2018 | Passolt | G06Q 50/02 |
| 2018/0100392 A1 | 4/2018 | Kleinguetl et al. | |
| 2018/0299849 A1 | 10/2018 | Martin et al. | |
| 2018/0341252 A1 | 11/2018 | Lu | |
| 2019/0153701 A1 | 5/2019 | Gates | |
| 2019/0205484 A1 | 7/2019 | Morkos et al. | |
| 2019/0213040 A1 | 7/2019 | Ohba | |
| 2019/0226314 A1 | 7/2019 | Dasys et al. | |
| 2019/0302310 A1 | 10/2019 | Fox et al. | |
| 2019/0325534 A1* | 10/2019 | Perry | G06Q 10/087 |
| 2019/0330968 A1 | 10/2019 | Boone et al. | |
| 2019/0333164 A1 | 10/2019 | Fox et al. | |
| 2020/0080412 A1 | 3/2020 | Johnsen et al. | |
| 2020/0081882 A1 | 3/2020 | Cheriton | |
| 2020/0174455 A1 | 6/2020 | Fox et al. | |
| 2020/0175443 A1 | 6/2020 | Fox et al. | |
| 2020/0291764 A1 | 9/2020 | Chahine et al. | |
| 2020/0355059 A1 | 11/2020 | Zhang et al. | |
| 2020/0410622 A1* | 12/2020 | Bhat | G06N 20/00 |
| 2021/0140294 A1 | 5/2021 | Mollatt | |

FOREIGN PATENT DOCUMENTS

| | | |
|---|---|---|
| CN | 102484619 A | 5/2012 |
| WO | 2016172031 A1 | 10/2016 |
| WO | 2017070025 A1 | 4/2017 |
| WO | 2017079178 A1 | 5/2017 |
| WO | WO-2019209947 A1 * | 10/2019 ............. G01W 1/10 |
| WO | 2019222033 A1 | 11/2019 |

OTHER PUBLICATIONS

Bajada, J. et al., "Load Modelling and Simulation of Household Electricity Consumption for the Evaluation of Demand-Side Management Strategies," 4th IEEE PES Innovative Smart Grid Technologies Europe, Oct. 6-9, 2013, Copenhagen, 5 pages.

Coles, A. et al., "Managing concurrency in temporal planning using planner-scheduler interaction", Artificial Intelligence 173, 2009, pp. 1-44.

Erol, K. et al., "UMCP: A Sound and Complete Procedure for Hierarchical Task-Network Planning", AIPS 1994 Proceedings, pp. 249-254.

Fox, M. et al., "Explainable Planning", IJCAI-17 Workshop on Explainable AI, Melbourne, Aug. 2017, 7 pages.

International Search Report and Written Opinion issued in International Patent Application No. PCT/US2019/031645, dated Aug. 20, 2019, 17 pages.

Johnsen, S.O. O. et al., "Proactive Indicators To Control Risks in Operations of Oil and Gas Fields", SPE-126560, SPE Economics & Management, 2012, 4(2), pp. 90-105.

Awasthi, A. et al., "Closign the Gap Between Reservoir modeling and Production Optimization", SPE-107463, presented at the Digital Energy Conference and Exhibition, Houston, Texas, U.S.A., 2007.

"Overlay", Apr. 8, 2015, Merriam Webster.

Office Action issued in U.S. Appl. No. 16/208,625 dated Oct. 26, 2021, 34 pages.

Naghdy, Fazel, and Naeem Anjum, "Discrete-event modelling, simulation and control of a distributed manipulation environment", 1997, Robotica 15(2), pp. 181-198.

Xu, Yingzhuo, and Hangi Hu, "Research of cooperative system for drilling design based on Smart Client", 2010 IEEE International Conference on Intelligent Computing and Intelligent Systems, vol. 3, IEEE, 2010.

Balasubramanian, Sivaram, and Douglas H. Norrie, "A multiagent architecture for concurrent design, process planning, routing, and scheduling", 1996 Concurrent Engineering 4 (1), pp. 7-16.

Marier, A., A. El Mhamedi, and Z. Binder, "Analysis of a computer-aided teleoperation process by means of generalized stochastic Petri nets", 1997, Control Engineering Practice 5 (7), pp. 931-942.

Office Action issued in U.S. Appl. No. 16/208,644 dated Dec. 15, 2021, 44 pages.

Office Action issued in U.S. Appl. No. 16/208,644 dated Aug. 20, 2021, 35 pages.

Office Action issued in U.S. Appl. No. 16/208,625 dated Sep. 9, 2022, 49 pages.

(56) References Cited

OTHER PUBLICATIONS

Office Action issued in U.S. Appl. No. 16/208,644 dated Jul. 22, 2022, 34 pages.
David, R. M. et al., "Managing and Orchestrating Multi-Vendor Intelligent Oil Field Technology Environment to Enable Efficient Next Generation Production and Reservoir Management Workflows", SPE-176773-MS, presented at the SPE Middle East Intelligent Oil & Gas Conference & Exhibition held in Abu Dhabi, UAE, 2015, 7 pages.
"Overlay", Merriam-Webster.com: https://www.merriam-webster.com, Mar. 7, 2023, 1 page.
"Lock", Merriam-Webster.com: https://www.merriam-webster.com, Mar. 7, 2023, 4 pages.
Office Action issued in U.S. Appl. No. 16/208,625 dated Mar. 17, 2023, 48 pages.
1 Office Action issued in U.S. Appl. No. 16/208,644 dated Feb. 15, 2023, 45 pages.
International Search Report and Written Opinion issued in the PCT Application PCT/US2019/031641, dated Jul. 17, 2019 (11 pages).
International Preliminary Report on Patentability issued in the PCT Application PCT/US2019/031641, dated Nov. 26, 2020 (8 pages).
Extended Search Report issued in European Patent Application 19802620.5 dated Jan. 3, 2022, 12 pages.
Anonymous: "Planning Domain Definition Language—Wikipedia",Mar. 26, 2018, pp. 1-8. Retrieved from the internet: [URL:https://en.wikipedia.org/w/index.php?title=Planning_Domain_Definition_Language&oldid=832433831] retrieved on Dec. 14, 2021.
Office Action issued in U.S. Appl. No. 16/208,644 dated May 8, 2023, 46 pages.
Office Action issued in U.S. Appl. No. 16/208,625 dated Aug. 31, 2023, 65 pages.
Office Action and Search Report issued in Norway Patent Application No. 20201174 dated Aug. 23, 2023, 4 pages.
Office Action issued in U.S. Appl. No. 16/208,644 dated Oct. 11, 2023, 53 pages.
First Office Action and Search Report issued in China Patent Application No. 2019800385749 dated Oct. 11, 2023, 12 pages with English translation.
Office Action issued in U.S. Appl. No. 16/208,644 dated Feb. 12, 2024, 52 pages.
Nogueira, T. et al., "Autonomously Controlling Flexible Timelines: From Domain-independent Planning to Robust Execution", 2017, 2017 IEEE Aerospace Conference, 15 pages.
Dvorak, F. et al., "Planning and Acting with Temporal and Hierarchical Decomposition Models", 2014, 2014 IEEE 26th International Conference on Tools with Artificial Intelligence.
First Office Action and Search Report issued in China Patent Application No. 201980045491.2 dated Nov. 8, 2023, 14 pages with English translation.
Office Action issued in U.S. Appl. No. 16/208,625 dated Jan. 17, 2024, 74 pages.
Ingrand, Felix et al., "Deliberation for autonomous robots: A Survey", Artificial Intelligence, 2017 (247), pp. 10-44.
Talcott, C. et al., "Soft Agents: Exploring Soft Constraints to Model Robust Adaptive Distributed Cyber-Physical Agent Systems", Software, Services, and Systems, Cham: Springer Interntional Puslishing, 2015, pp. 273-290.
Office Action issued in U.S. Appl. No. 16/208,625 dated May 9, 2024, 88 pages.
Office Action issued in U.S. Appl. No. 16/208,644 dated Jun. 21, 2024, 53 pages.
Pardo, P. et al., "Cooperative Dialogues for Defeasible Argumentation-based Planning", in Argumentation in Multi-Agent Systems, Berlin, Heidelberg: Springer, 2011, pp. 174-193.
Hertle, A. et al., "Efficient Audition Based Coordination for Distributed Multi-agent Planning in Temporal Domains Using Resource Abstraction", in KI 2018: Advances in Artificial Intelligence, Springer, 2018, pp. 86-98.
Office Action issued in U.S. Appl. No. 16/208,625 dated May 5, 2024, 88 pages.

Notice of Allowance issued in U.S. Appl. No. 16/208,625 dated Sep. 24, 2024, 25 pages.
Article 94(3) issued in European Patent Appl. No. 19802620.5 on Oct. 8, 2024. 10 pages.
Fox, M., and Long, D. 2003. PDDL2.1: An extension to PDDL for expressing temporal planning domains. J. Artif. Int. Res. 20(1):61{124.
Firby, Adaptive Execution in Complex Dynamic Worlds. Ph.D. Thesis, Yale University Department of Comuter Science, 1989.
Simmons et al., "A Task Description Language for Robot Control", Proceedings of the Conference on Intelligent Robotics and Systems, Vancouver, Canada, Oct. 1998, pp. 1931-1937.
Gat, E., "ESL: A Language for Supporting Robust Plan Execution in Embedded Autonomous Agents", Proceedings of the AAAI Fall Symposium on Plan Execution, 1996, pp. 319-324.
Berry, G., The esterel v5 Language Primer, version 5.21 release 2.0, Centre de Mathematiques Appliquees, Ecole des Mines and INRIA, Apr. 6, 1999, 140 pgs.
Ingham et al., 2001: A Reactive Model-Based Programming Language for Robotic Space Explorers, Proceedings of ISAIRAS-01, 8 pages.
Berry et al., "The ESTEREL synchronous programming language: design, semantics, implementation", Science of Computer Programming, 19(2): 87-152, 1992.
Coles et al., "Forward-chaining partial-order planning", In Proceedings of the 20th International Conference on Automated Planning and Scheduling, ICAPS 2010, Toronto, Ontario, Canada, May 12-16, 2010, pp. 42-49, 2010.
Henzinger, "The Theory of Hybrid Automata", in Proceedings, 11th Annual IEEE Symposium on Logic in Computer Science, pp. 278-292, 1996.
Lamport, "Time, clocks, and the ordering of events in a distributed system", Communications of the ACM, 21(7): 558-565, 1978.
Williams et al., "Model-based programming: Controlling embedded systems by reasoning about hidden state", in Principles and Practice of Constraint Programming—CP 2002, 8th International Conference, CP 2002, Ithaca, NY, USA, Sep. 9-13, 2002, Proceedings, pp. 508-524, 2002.
Apt et al., "Towards a theory of declarative knowledge", in Foundations of Deductive Databases and Logic Programming, pp. 89-148, 1988.
Bacchus et al., "Downward Refinement and the Efficiency of Hierarchical Problems-Solving", Artificial Intelligence, vol. 71, pp. 43-100, 1994.
Bernardini et al., "Leveraging Probabilistic Reasoning in Deterministic Planning for Large-Scale Autonomous Search-and-Tracking", in Proc. 26th International Conference on Automated Planning and Scheduling (ICAPS), pp. 47-55, 2016.
Bonasso et al., "Experiences with an Architecture for Intelligent Reactive Agent", Journal of Experimental and Theoretical Artificial Intelligence (JETAI), 9, 1997, 24 pages.
Coddington et al., "Madbot: A motivated and goal directed robot", in Proc. Of National conference on AI (AAAI), vol. 20, pp. 1680, 2005.
Fox et al., "Exploration of the Robustness of Plans", in Proc. 21st National Conference on Artificial Intelligence (AAAI), pp. 834-839, 2006.
GAT, "On Three-Layer Architecutes", Artificial Intelligence and Mobile Robots, 195, 11 pages, 1998.
Gregory et la., "Planning Modulo Theories: Extending the Planning Paradigm", in Proc. 22nd International Conference on Automated Planning and Scheduling (ICAPS), 2012, 9 pages.
Hoffmann et al., "The FF Planning Systems: Fast Plan Generation Through Heuristic Search", J. Artif. Intell. Res. (JAIR), 14:253-302, 2001.
Howey et al., "VAL: automatic plan validation, continuous effects and mixed initiative planning using PDDL", in Proc. 16th IEEE International Conference on Tools with Artificial Intelligence (ICTAI), pp. 294-301, 2004.
Koymans et al., "Specifying Real-Time Properties with Metric Temporal Logic", Real-Time Systems, 2(4): 255-299, 1990.
McGann et la., "A Deliberative architecture for AUV Control", in Proc. IEEE International Conference on Robotics and Automation (ICRA), pp. 1049-1054, 2008.

(56) References Cited

OTHER PUBLICATIONS

Nieuwenhuis, "SAT modulo theories: Enhancing SAT with special-purpose algorithms", in Proc. 12th International Conference on Theory and Applications of Satisfiability Testing (SAT), p. 1, 2009.

Williams et al., "Model-based Programming of Intelligent Embedded Systems and Robotic Space Explorers", Proceedings of the IEEE, 91(1): 212-237, 2003.

Yoon et al., "FF-Replan: A Baseline for Probabilistic Planning", in Proc. 17th International Conference on Automated Planning and Scheduling (ICAPS), 2007, 8 pages.

\* cited by examiner

FIG. 6

OPERATIONS MANAGEMENT NETWORK SYSTEM AND METHOD

CROSS-REFERENCE TO RELATED APPLICATIONS

This application claims priority to and the benefit of U.S. Provisional Application No. 62/671,760, titled "Operations Management Network System and Method," filed May 15, 2018, the entire disclosure of which is hereby incorporated herein by reference.

BACKGROUND OF THE DISCLOSURE

In oil and gas wellsite network operations, which may include cementing and fracturing operations at various wellsites within a wellsite network, various wellsite components and equipment are utilized. The success of such wellsite operations may be related to many factors, including quality execution of control, maintenance, and repair of the wellsite equipment, as well as efficient, seamless supply chain management. Indeed, in wellsite operations management, particularly for fracturing operations, supply chain issues can sometimes represent the single largest cause of non-productive time (NPT) for wellsites.

Quality and efficient execution of wellsite operations can utilize insight and knowledge gained by wellsite operators over time and through experience. Supply chain execution, in particular, can be made more efficient by dynamically adjusting to delays and unexpected issues in real time. Accordingly, such wellsite operations may be optimized, in part, by slavishly following a complex set of rigid operational rules designed to encourage high efficiency in a number of ways. However, human planners can easily become overwhelmed by the sheer number of interrelated tasks and the cascading effect of issues/failures on series tasks. Moreover, circumstances and issues of a particular job and the way such issues were resolved can be particularly informative in pattern recognition and can facilitate quicker problem solving. Hence, applying operational rules in tandem with historical operational information and automating some responses can facilitate more efficient operation, with humans stewarding, instead of directly handling, as many actions as possible.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 6 is a sample schedule of a detailed plan that can be generated by an example implementation of a method according to one or more aspects of the present disclosure.

Figure 1:
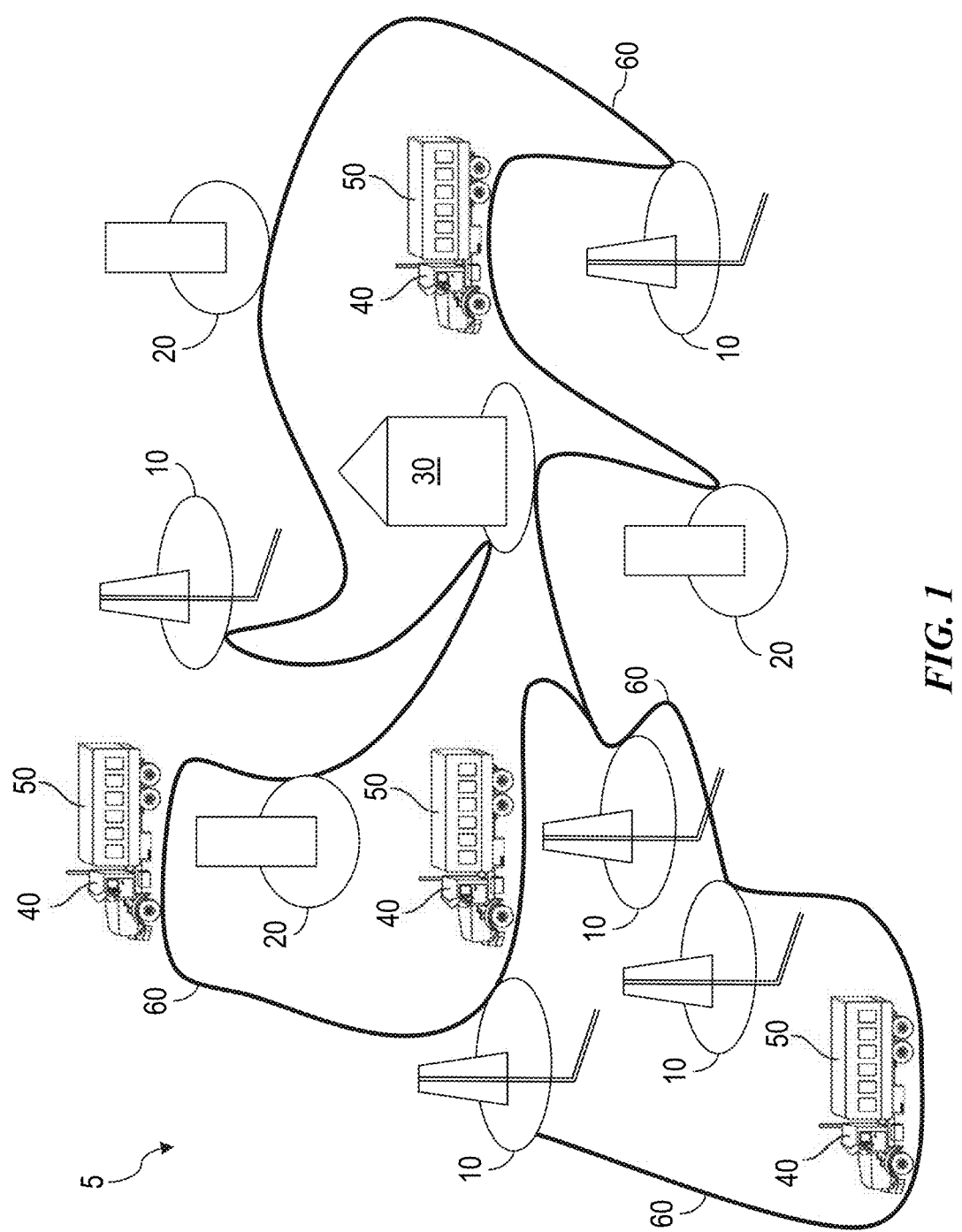
FIG. 1 is a schematic view of at least a portion of an example implementation of an operations system according to one or more aspects of the present disclosure.

In the appended figures, similar components and/or features may have the same reference label. Further, various components of the same type may be distinguished by following the reference label by a dash and a second label that distinguishes among the similar components. If just the first reference label is used in the specification, the description is applicable to each of the similar components having the same first reference label irrespective of the second reference label.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including generating a current detailed plan comprising actions to be taken and a corresponding time for each action to be taken with regard to wellsites that utilize supplies from supply sites remote from the wellsites. The detailed plan minimizes aggregate NPT for the wellsites within constraints of wellsite inputs and supply site inputs. The supplies include materials utilized for fracturing operations conducted at the wellsites. The actions are based on location of transportation equipment for transporting the supplies from the supply sites to the wellsites, distance of each transportation equipment from one of the supply sites and/or one of the wellsites, loading time for the supplies at one of the supply sites, and unloading time for the supplies at one of the wellsites. The actions include a schedule of inventory actions and corresponding times at which a specific quantity and a specific type of each of the supplies is to be ordered from a distributor.

The present disclosure also introduces a method including operating wellsites that utilize supplies from supply sites remote from the wellsites. For each wellsite, wellsite inputs are provided relating to status of the wellsite, user- and/or task-defined goals for the wellsite, and/or rate of consumption of supplies for attaining the goals for the wellsite. For each supply site, supply site inputs are provided relating to inventory of supplies, logistics of supply chain between the supply site and each wellsite, and/or logistics of re-supply of supplies to the supply site. Based on the wellsite inputs and the supply site inputs, a current detailed plan is generated, including actions to be taken and a corresponding time for each action to be taken. The detailed plan minimizes aggregate non-productive time for the wellsites, within constraints of the wellsite inputs and the supply site inputs. The current detailed plan is provided as a schedule to permit stewarding or accomplishment of each action at each corresponding time. After generation of an initial detailed plan, each wellsite input and/or each supply site input either validates the current detailed plan without changes or causes one or more changes to replace the current detailed plan.

The present disclosure also introduces an apparatus including a computing system having a processor and a memory system including a non-transitory, computer-readable media storing instructions that, when executed by the processor, causes the computing system to perform operations. The operations include, for each of multiple wellsites, providing wellsite inputs relating to status of the wellsite, to user- or task-defined goals for the wellsite, and to rate of consumption of supplies for attaining the goals for the wellsite. The operations also include, for each of multiple supply sites each remote from each wellsite, providing supply site inputs relating to inventory of supplies, logistics of supply chain between the supply site and each wellsite, and to logistics of re-supply of supplies to the supply site. The operations also include, based on the wellsite inputs and the supply site inputs, generating a current detailed plan including actions to be taken and of a corresponding time for each action to be taken. The detailed plan minimizes aggregate NPT for the wellsites, within constraints of the wellsite inputs and the supply site inputs. The operations also include providing the current detailed plan as an output to the processor for display as a schedule to permit stewarding or accomplishment of each action at each corresponding time. After generation of an initial detailed plan, each wellsite input and/or each supply site input either validates the current detailed plan without changes or causes one or more changes to replace the current detailed plan, which is then output for display to a user via the processor.

The present disclosure also introduces a computer program product including a non-transitory, computer-readable medium storing instructions that, when executed by a processor of a computing system, cause the computing system to perform operations that include, for each of multiple wellsites, providing wellsite inputs relating to status of the wellsite, to user- or task-defined goals for the wellsite, and to rate of consumption of supplies utilized to attain the goals for the wellsite. The operations also include, for each of multiple supply sites each remote from each of the wellsites, providing supply site inputs relating to inventory of supplies, logistics of supply chain between the supply site and each wellsite, and to logistics of re-supply of supplies to the supply site. The operations also include, based on the wellsite inputs and the supply site inputs, generating a current detailed plan including actions to be taken and of a corresponding time for each action to be taken. The detailed plan minimizes aggregate NPT for the wellsites, within constraints of the wellsite inputs and the supply site inputs. The operations also include providing the current detailed plan as an output to the processor, for display as a schedule to permit stewarding or accomplishment of each action at each corresponding time. After generation of an initial detailed plan, each wellsite input and/or each supply site input may either validate the current detailed plan without changes or cause one or more changes to replace the current detailed plan, which may then be output for display to a user via the processor.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

DETAILED DESCRIPTION

The ensuing description provides various embodiments, and is not intended to limit the scope, applicability or configuration of the invention. Rather, the ensuing description of the various embodiments may provide those skilled in the art with an enabling description for implementing one or more embodiments according to the disclosure. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, certain operations can be performed in parallel or concurrently. In addition, the order of the operations may be re-arranged. A process is terminated when its operations are completed, but could have additional steps not included in the embodiment description. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine-readable media for storing information. The term "computer-readable medium" includes, but is not necessarily limited to, portable or fixed storage devices, optical storage devices, wireless channels, and various other mediums capable of storing, containing, or carrying instruction(s) and/or data.

Furthermore, embodiments within the scope of the present disclosure may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. One or more processors may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and may not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Aspects of the present disclosure generally pertain to material logistics at an oil and/or gas wellsite. For example, a wellsite engineer, other personnel, and/or a computing system may maintain a schedule of stages to be completed (e.g., during a hydraulic fracturing operation) at the wellsite, including time details and materials that will be consumed at each stage. The schedule may be broadcast to a centralized logistics center (referred to below as a planning center) where the schedule is interpreted (via personnel and/or a computing system) as a material demand schedule. The centralized logistics center also considers current inventory at the wellsite and other wellsites, as well as materials being transported to the wellsites. This information cumulatively permits determining projected/forecasted inventory at the wellsites. Accordingly, NPT and/or demurrage (cost associated with trucks waiting at a wellsite to unload materials) may be predicted, such that the centralized logistics center may reduce or prevent the NPT and/or demurrage. The schedule may be referred to as a planned completion strategy or a look-ahead schedule.

Systems and methods according to the present disclosure will now be described with reference to a specific example of a network of a plurality of wellsites, a plurality of supply sites, and optionally a planning center, and to a method of improving or optimizing the operation of such wellsite network, particularly its supply, so as to reduce or minimize NPT. As noted above, this is merely an example of one form of a system and/or method according to the present disclosure, and other additional components or elements may be additionally included.

FIG. 1 shows a cartoon map representation of a network of wellsite operations 5. In FIG. 1, a plurality of wellsites 10 are geographically located amongst a plurality of supply sites 20 that are remote (i.e., located at an appreciable distance) from the wellsites 10. An optional planning (e.g., command and control) center 30 may additionally be present, e.g., as a site which is not a wellsite (e.g., does not produce a wellsite resource) and which is not a supply site (e.g., does not store or ship wellsite supplies). These sites are connected by a set of supply transportation pathways (in this case, roads) 60, via which transportation equipment (e.g., trucks and other mobile carriers) 40 may be dispatched to carry supplies 50 from one or more of the supply sites 20 to one or more of the wellsites 10. Though FIG. 1 shows a network 5 of five wellsites 10, three supply sites 20, one optional planning center 30, four mobile carriers 40 each with a payload of supplies 50, and a single set of roads 60 connecting these sites 10/20 together, it should be understood that there may alternately be more or fewer wellsites 10, more or fewer supply sites 20, more or no planning centers 30, more or fewer mobile carriers 40 and payloads of supplies 50, and an interconnected network of supply transportation pathways, such that the wellsite operations network 5 depicted in FIG. 1 is one of many possible examples of wellsite operations networks within the scope of the present disclosure.

Within various networks of the present disclosure, such as the example network 5 shown in FIG. 1, operations management methods can be employed to increase or optimize operational efficiency. Through operations management methods, component parts of collective wellsite operations can be compartmentalized and itemized, with goals to be achieved being broken down into discrete tasks, which can be subject to cause-and-effect rules or requirements and preconditions, for example. Although it is possible for human planners to control the complex interplay between task performance, success or failure, and attainment of goals, at least some of the planning and/or implementation process in operations management can be automated. To facilitate non-human (computer) control of planning tasks to attain goals, certain details of progressing through tasks to attain goals can be expressed as inputs for operations at the various sites (wellsites and supply sites, inter alia). These wellsite and supply site inputs can be manually entered by a user, can be calculated from analysis of historical information (data) based on similar operations at similar wellsites and/or supply sites, or combinations thereof. This can facilitate humans to act as stewards or facilitators for at least some of the planning actions implicated by the tasks/goals, e.g., monitoring status and/or completion, while other actions may still be accomplished with direct human intervention. By using historical information in an analysis about which certain actions can be prioritized and which actions can be deprioritized, it is possible to decrease or eliminate user-defined weighting (importance) of goals/tasks/inputs. In some cases, given information regarding the effect of each action on the goal(s), this data can be combined with user-input information on the resource production or on the economic impact, for example, of the goal(s) at each wellsite (or of a combination of goals at more than one wellsite, in aggregate) to permit the system to prioritize or deprioritize actions with direct effect but without an external weighting factor being entered for each task/goal/action by a user.

Increasing or optimizing wellsite operations efficiency may entail reducing or minimizing aggregate NPT for the plurality of wellsites 10, reducing or minimizing aggregate operating costs for both the plurality of wellsites 10 and the plurality of supply sites 20, increasing or maximizing aggregate resource production for the plurality of wellsites 10, increasing or maximizing aggregate net income from both the plurality of wellsites 10 and the plurality of supply sites 20, attaining as many goals as possible and/or completing as many tasks as possible toward the goals of the wellsite operations, or combinations thereof.

Wellsite inputs can include, but are not necessarily limited to, (operational) status of each wellsite 10 in the network 5, user- or task-defined goals for each wellsite 10 in the network 5, and rate of consumption of supplies 50 to be utilized to attain the goals for each wellsite 10 in the network 5. Supply site inputs can include, but are not necessarily limited to, inventory of supplies 50, logistics of the supply chain between each supply site 20 and each wellsite 10 in the network 5, and logistics of re-supply of supplies 50 to each supply site 20 in the network 5. The logistics of the supply chain between each supply site 20 and each wellsite 10 can include, but are not necessarily limited to, location of a plurality of transportation equipment/carriers 40 for shipping the supplies 50, distance of each of the plurality of transportation equipment/carriers 40 from each supply site 20 and/or from each wellsite 10, loading time for the supplies 50 at a supply site 20, and unloading time for the supplies 20 at a wellsite 10, inter alia.

In the methods within the scope of the present disclosure, the wellsite and supply site inputs can both facilitate goals/tasks to be discretized and establish a framework of constraints within which wellsite operations efficiency can be increased or optimized. Although it is possible for human decision making in wellsite operations management to flexibly select attainment or completion of certain goals or tasks over others with goals other than NPT reduction and/or operations cost reduction, non-human decision making in methods according to the disclosure can permit flexible selection for attainment or completion of as many goals or tasks as possible, within the constraints of the wellsite inputs and supply site inputs.

Based on the wellsite inputs and the supply site inputs, as well as changes thereto during wellsite operations, a detailed plan can be generated and/or updated, as applicable, to facilitate attaining efficient operations management within the constraints of the inputs. The detailed plan may be considered current when it is generated and/or updated, and can remain current until an input caused by an unforeseen event is received, at which point another detailed plan is generated, including remedial steps to recover from the unforeseen event, which detailed plan then becomes regressively current again. The current detailed plan may comprise a plurality of actions to be taken and corresponding times for each action to be taken. In order to facilitate human review of the current detailed plan, and/or to permit human stewarding or accomplishment of each action at each corresponding time, the current detailed plan can advantageously be represented as a Gantt chart and/or other schedule-based form.

A potential advantage of such "plan-based automation" may be that the component that dispatches the actions in the plan takes into consideration those events that are expected, and which events to watch for, in order to render the current plan invalid and trigger re-planning as soon as possible. In contrast, if just GPS coordinates changes are subscribed to as input, for example, then the plan would be regenerated every fifteen minutes (for example) for no reason. However, the present disclosure introduces that the current plan includes validity constraints such as "truck A must arrive to transload T no later than at 1:00 pm." Thus, rather than reacting to GPS coordinates, the present disclosure introduces reacting to an event such as "Estimated time of arrival (ETA) of truck A to transload T is 1:01 pm," and then re-plan per the plan-based automation.

The plan can contain various operational constraints that can be associated with the plurality of actions to be taken at their corresponding times. The operational constraints may be imposed by one or more of the wellsite and/or supply site configurations/limitations and/or may be based on the historical information.

In an example implementation of a method according to one or more aspects of the present disclosure, the plurality of wellsites 10 may be lacking supplies 50 to be delivered from a plurality of supply sites 20 that are remote from the plurality of wellsites 10. The plurality of wellsites 10 can each have a status, such as an operational status, as well as one or more goals for the wellsite, which may be imposed by a planner and/or which may be defined by an array of tasks. For example, one, some, or each of the plurality of wellsites 10 may have a goal of producing a resource through a fracturing or "fracking" operation, in which case the supplies 50 from the plurality of supply sites 20 may include one or more types of proppant (e.g., sand, coated sand, or the like, or mixtures thereof). Thus, in these situations, an input for each wellsite 10 at which fracking operations are to be conducted may include the type of proppant to be used.

The plurality of actions can comprise a schedule of dispatch actions and corresponding times at which a specific transportation equipment is to be sent to a specific site to load or unload a specific type of proppant. Additionally, or alternatively, the plurality of actions can comprise a schedule of dispatch actions and corresponding times at which a specific transportation equipment is to be held at a specific site or to be returned to a neutral site, awaiting instruction to load, unload, or move to another specific site. Further additionally or alternatively, the plurality of actions can comprise a schedule of inventory actions and corresponding times at which a specific quantity and a specific type of proppant is to be ordered from a distributor.

At least one of the wellsite inputs and/or supply site inputs for generating the current detailed plan can be remotely sensed and automatically provided. Additionally, or alternatively, at least one of the wellsite inputs and/or supply site inputs for generating the current detailed plan can be provided by a user based on observation.

Historical information about operation, goals, and logistics involving the plurality of wellsites can be consulted, if not relied upon, in order to assist in attaining efficient operations.

The input(s) relating to the status of each wellsite can comprise or be just a percentage completion of the goals for the wellsite, but may optionally include a parameter relating the rate of consumption of supplies used (or currently lacking) to attain the goals of the wellsite to a speed of attainment of the goals for the wellsite. For example, in the case of a wellsite fracturing operation, a supply of proppant may be necessary to begin resource production. Thus, at the beginning stages of resource production, rate of consumption of proppant may be intimately related to producing a resource in a fracturing operation, indicating a relatively high value of the parameter. However, there may be a time during fracturing operation where one or more other actions may be taken that does not depend on additional proppant supply. During such time, the parameter relating rate of consumption of proppant to attaining the goal of resource production may have a relatively low value (or even zero). Also during such time, as the parameter has a relatively low value at a given wellsite, relatively little consequence comes from prioritizing proppant delivery to other wellsites at the expense of re-supplying the given wellsite with proppant for a future resource production.

The input(s) relating to the status of each wellsite may comprise no detailed information on any equipment or personnel to be utilized, nor on specific tasks to be completed, to attain the goals for the wellsite. In these implementations, assuming that wellsite operations are monitored closely (for safety, if for nothing else), there may be a separate system that monitors in great detail the wellsite operations, permitting more of a focus on the supply chain in the methods according to the present disclosure.

Nevertheless, some methods according to one or more aspects of the present disclosure can function to efficiently monitor wellsite operations seamlessly with efficiently monitoring supply chain. In such embodiments, the inputs or goals for each wellsite can comprise or be associated with, among other things, a list of equipment to be utilized, a list of personnel to be utilized, and a list of tasks to be completed, as well as an order in which the tasks are to be completed, in order to attain the goals of the wellsite. Additionally, or alternatively, the input(s) relating to the status of the wellsite can further comprise or be an operational status for each piece of equipment used, and a maintenance status for each piece of equipment used, to attain the goals for the wellsite. Optionally, the input(s) relating to the status of the wellsite can include an estimation of time, manpower, and parts to be utilized to convert a non-operational piece of equipment having no operational status (or a failure condition in maintenance status) into an operational piece of equipment having an operational status (or a non-failure condition in maintenance status).

Methods within the scope of the present disclosure can further include one or more of the following: a list of pieces of available equipment that are involved in attaining the goals for each wellsite and of supplies available at each supply site, or otherwise attainable through a distributor (outside of inventory), that are involved in attaining the goals for each wellsite; a current location for each piece of available equipment and each supply in the list; and a desired length of time over which the current detailed plan is to be implemented and across which operational efficiency is to be optimized.

At least a portion of the wellsite and/or supply site inputs can include one or more preconditions to be met in order for one or more tasks from the list of tasks to be completed. In such implementations, at least a portion of the wellsite and/or supply inputs can encompass one or more causal effects of failure of either one or more of the preconditions or one or more of the tasks themselves. By doing so, certain tasks and/or certain actions can be dynamically prioritized to attain certain goals, optimally without a user having to estimate or allocate (and offer as an additional input) a weighting factor amongst each input/task/goal.

Figure 2:
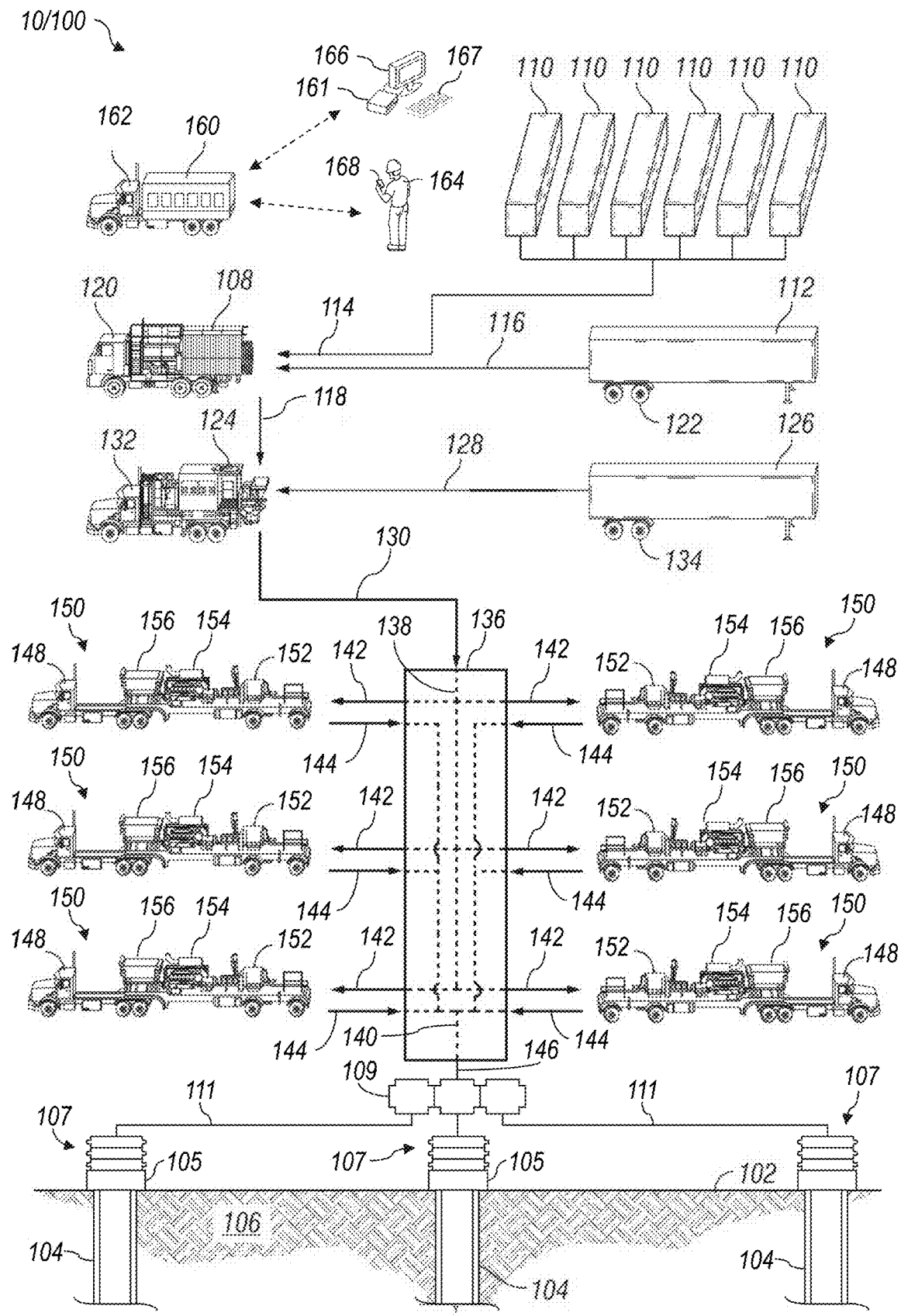
FIG. 2 is a schematic view of at least a portion of an example implementation of a wellsite system according to one or more aspects of the present disclosure.

FIG. 2 is a schematic view of at least a portion of an example implementation of a wellsite system 100 of at least one of the wellsites 10 depicted in FIG. 1. The following description refers to FIGS. 1 and 2, collectively.

One or more wellbores 104 (with wellheads 105) may extend from the terrain surface 102 of the wellsite 10. FIG. 2 also includes a partial sectional view of a subterranean formation 106 penetrated by the wellbore(s) 104. The wellsite system 100 may be or comprise a fracking system, such as may be operable for blending or mixing various materials and additives from corresponding sources 110, 112, 126, located at the wellsite 10, and for subsequently injecting such mixtures into one of the wellbores 104 during fracturing and other stimulation operations. Such operations may be partially or fully automated. The sources 110, 112, 126 are examples of the different material supplies 50 to be provided/replenished from perhaps different and/or corresponding ones of the supply sites 20 via the transportation equipment 40, perhaps via command/control provided or at least supported by the planning center 30.

The wellsite system 100 may comprise a mixing unit 108 (referred to hereinafter as a "mixer") fluidly connected with one or more tanks 110 and a container 112. The container 112 may contain a first material and the tanks 110 may contain a liquid. The first material may be or comprise a hydratable material or gelling agent, such as cellulose, clay, galactomannan, guar, polymers, synthetic polymers, and/or polysaccharides, among other examples. The liquid may be or comprise an aqueous fluid, such as water or an aqueous solution comprising water, among other examples. The mixer 108 may be operable to receive the first material and the liquid, via two or more conveyors, conduits, and/or other material transfer means (hereafter simply "conduits") 114, 116, and mix or otherwise combine the first material and the liquid to form a base fluid, which may be or comprise that which is known in the art as a gel. The mixer 108 may then discharge the base fluid via one or more conduits 118.

The wellsite system 100 may further comprise a mixer 124 fluidly connected with the mixer 108 and a container 126. The container 126 may contain a second material that may be substantially different than the first material. For example, the second material may be or comprise a proppant material, such as quartz, sand, sand-like particles, silica, and/or propping agents, among other examples. The mixer 124 may be operable to receive the base fluid from the mixer 108 via the one or more conduits 118, to receive the second material from the container 126 via one or more conduits 128, and to mix or otherwise combine the base fluid and the second material to form a mixture. The mixture may be or comprise that which is known in the art as a fracturing fluid. The mixer 124 may then discharge the mixture via one or more conduits 130.

The mixture may be communicated from the mixer 124 to a manifold 136 via the one or more conduits 130. The manifold 136 may comprise a low-pressure distribution manifold 138, a high-pressure collection and discharge manifold 140, and various valves and diverters, such as may be collectively operable to direct the flow of the mixture in a predetermined manner. The manifold 136, which may be known in the art as a missile or a missile trailer, may receive the mixture from the one or more conduits 130 and distribute the mixture to a fleet of pump units 150 via the low-pressure distribution manifold 138. Although the fleet is shown comprising six pump units 150, the fleet may comprise other quantities of pump units 150 within the scope of the present disclosure.

Each pump unit 150 may comprise a pump 152, a prime mover 154, and perhaps a heat exchanger 156. Each pump unit 150 may receive the mixture from a corresponding outlet of the low-pressure distribution manifold 138 of the manifold 136, via one or more conduits 142, and discharge the mixture under pressure into a corresponding inlet of the high-pressure collection and discharge manifold 140 via one or more conduits 144. The mixture may then be discharged from the high-pressure collection and discharge manifold 140 into a frac manifold 109 via one or more conduits 146.

Each wellhead 105 may comprise or be associated with a plurality of valves 107. The valves 107 depicted in FIG. 2 schematically represent multiple components that may fluidly interpose the frac manifold 109 and each wellhead 105, or that are connected or otherwise associated with each wellhead 105. For example, the schematically-depicted valves 107 may comprise a blow-out preventer (BOP). However, the valves 107 may also comprise a frac tree and/or valves for switching between fluid sources.

The frac manifold 109 comprises an arrangement of flow fittings and valves installed downstream of the manifold 136 and upstream of each frac tree served by the manifold 136. The frac manifold 109 is operable to quickly isolate wells 104 that have completed a frac cycle and for which intervention (e.g., plug and pump-down perforate) will next be performed, and is also operable to redirect the flow of frac fluid to the next well 104 (e.g., via conduits 111) that is prepared for the next frac cycle.

The wellsite system 100 may also have a control center 160 comprising a controller 161 (e.g., a processing device, a computer, a programmable logic controller (PLC), etc.), which may be operable to provide control to one or more portions of the wellsite system 100, including automated or semi-automated control. The controller 161 may also be operable to monitor health and functionality of one or more portions of the wellsite system 100. The controller 161 may be communicatively connected with the various wellsite equipment described herein, and perhaps other equipment, and may be operable to receive signals from and transmit signals to such equipment to perform various operations described herein. For example, the controller 161 may be operable to monitor and control one or more portions of the mixers 108, 124, the pump units 150, the manifold 136, the frac manifold 109, the valves 107, and various other wellsite equipment (not shown), such as may be collectively operable to move, mix, separate, pressurize, and/or measure the fluids, materials, and/or mixtures described above and inject such fluids, materials, and/or mixtures into the wellbores 104. The controller 161 may also monitor supply levels of one or more of the sources 110, 112, 126 and communicate with the planning center 30 for initial supply, replenishment, and/or removal from the wellsite 10. Such supply, replenishment, and/or removal may be automated, semi-automated, or otherwise based on planning, execution, and/or completion of various tasks of the fracturing and/or other operations performed by the wellsite system 100 and/or other wellsite systems at other wellsites 10. In this context, the controller 161 may store control commands, operational parameters and set-points, coded instructions, executable programs, and other data or information, including for implementing one or more aspects of the operations described herein.

Communication between the controller 161, the various portions of the wellsite system 100, and perhaps the planning center 30 may be via wired and/or wireless communication means. However, for clarity and ease of understanding, such communication means are not depicted in FIGS. 1 and 2, and a person having ordinary skill in the art will appreciate that such communication means are within the scope of the present disclosure.

A field engineer, equipment operator, or field operator 164 (collectively referred to hereinafter as a "wellsite operator") may operate one or more components, portions, or systems of the wellsite equipment and/or perform maintenance or repair on the wellsite equipment. For example, the wellsite operator 164 may assemble the wellsite system 100, operate the wellsite equipment (e.g., via the controller 161) to perform the stimulation operations, check equipment operating parameters, and repair or replace malfunctioning or inoperable wellsite equipment, among other operational, maintenance, and repair tasks, collectively referred to hereinafter as wellsite operations. The wellsite operator 164 may perform wellsite operations by himself or with other wellsite operators. The wellsite operator 164 and/or other human operators may also steward the material supply, replenishment, and removal described herein.

The controller 161 may be communicatively connected with one or more human-machine interface (HMI) devices, which may be utilized by the wellsite operator 164 for entering or otherwise communicating the control commands to the controller 161, and for displaying or otherwise communicating information from the controller 161 to the wellsite operator 164. The HMI devices may include one or more input devices 167 (e.g., a keyboard, a mouse, a joystick, a touchscreen, etc.) and one or more output devices 166 (e.g., a video monitor, a printer, audio speakers, etc.). The HMI devices may also include a mobile communication device 168 (e.g., a smart phone). Communication between the controller 161 and the HMI devices may be via wired and/or wireless communication means.

One or more of the containers 112, 126, the mixers 108, 124, the pump units 150, and the control center 160 may each be disposed on corresponding trucks, trailers, and/or other mobile carriers 122, 134, 120, 132, 148, 162, respectively, such as may permit their transportation to the wellsite 10. However, one or more of the containers 112, 126, the mixers 108, 124, the pump units 150, and the control center 160 may each be skidded or otherwise stationary, and/or may be temporarily or permanently installed at the wellsite 10. The manifold 136, the frac manifold 109, and/or other equipment described above or otherwise forming a portion of the system 100 may similarly be mobile, skidded, or otherwise installed at the wellsite 10.

Though not shown in FIG. 1, each of the wellsites 10, each of the supply sites 20, and/or each optional planning center 30 can have at least a portion of a computing system (not shown) that can connect the network 5 of sites electronically, much like the network of supply transportation pathways 60 connects the sites 10/20/30 geographically, whether such electronic connection is wired or wireless (e.g., satellite). Computing systems according to the present disclosure may, at a minimum, encompass one or more processors and a memory system. The memory system can include one or more non-transitory, computer-readable media for storing instructions that, when executed by at least one of the processors, may cause the computing system to perform operations in accordance with the methods and processes described herein.

Figure 3:
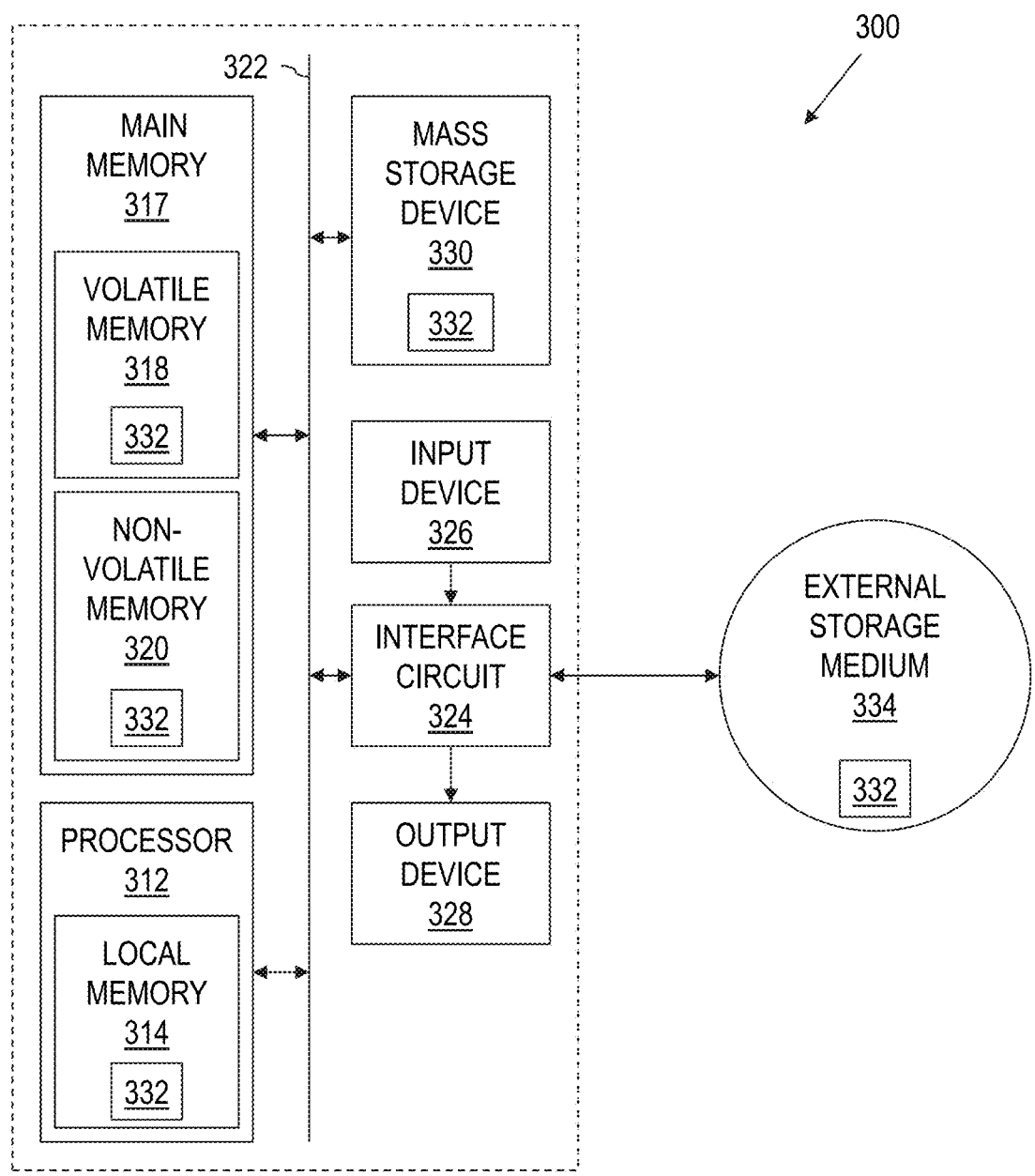
FIG. 3 is a schematic view of at least a portion of an example implementation of a computing system according to one or more aspects of the present disclosure.

For example, FIG. 3 is a schematic view of at least a portion of one such computing system 300, which can be used to accomplish methods according to one or more aspects of the present disclosure. The following description refers to FIGS. 1-3, collectively.

The computing system 300 may be or comprise, for example, one or more general- or special-purpose processors, computing devices, servers, personal computers, personal digital assistant (PDA) devices, smartphones, internet appliances, and/or other types of computing devices. The computing system 300 may comprise a processor 312, such as a general-purpose programmable processor. The processor 312 may comprise a local memory 314 and may execute coded instructions 332 present in the local memory 314 and/or another memory device. The coded instructions 332 may include machine-readable instructions or programs to implement the methods and/or processes described herein. For example, the coded instructions 332 may include program instructions or computer program code that, when executed by the processor 312, can facilitate performance of methods and/or processes described herein. The processor 312 may be, comprise, or be implemented by one or more processors of various types suitable to the local application environment, and may include one or more general- or special-purpose computers, microprocessors, digital signal processors (DSPs), field-programmable gate arrays (FPGAs), application-specific integrated circuits (ASICs), and/or processors based on a multi-core processor architecture, among other examples.

The processor 312 may be in communication with a main memory 317, such as via a bus 322 and/or other communication means. The main memory 317 may comprise a volatile memory 318 and/or a non-volatile memory 320. The volatile memory 318 may be, comprise, or be implemented by random-access memory (RAM), static random-access memory (SRAM), synchronous dynamic random-access memory (SDRAM), dynamic random-access memory (DRAM), RAMBUS dynamic random-access memory (RDRAM), and/or other types of random-access memory devices. The non-volatile memory 320 may be, comprise, or be implemented by read-only memory, flash memory, and/or other types of memory devices. One or more memory controllers (not shown) may control access to the volatile memory 318 and/or the non-volatile memory 320. The computing system 300 may be operable to store or record the signals or information generated and/or received into the main memory 317.

The computing system 300 may also comprise an interface circuit 324 to facilitate communications between the computing system 300 and one or more module communication devices. Each such module communication devices may comprise or be one or more instances of the input devices 326 and/or output devices 328 described below, but remote and/or external to the computing system 300. The interface circuit 324 may be, comprise, or be implemented by various types of standard interfaces, such as an Ethernet interface, a universal serial bus (USB) interface, and/or a third-generation input/output (3GIO) interface, among other examples. The interface circuit 324 may comprise a graphics driver card. The interface circuit 324 may also comprise a communication device, such as a modem or network interface card, to facilitate exchange of data with external computing devices via a network (e.g., Ethernet connection, digital subscriber line (DSL), telephone line, coaxial cable, cellular telephone system, satellite, etc.).

One or more input devices 326 may also be connected to the interface circuit 324. Each input device 326 may permit a human operator to enter data and/or commands for operation of the processor 312 (collectively, inputs), and/or other features of the computing system 300. For example, a human operator of an input device 326 at a wellsite 10 may be referred to in the context of the present disclosure as a wellsite user, a human operator of an input device 326 at a supply site 20 may be referred to herein as a supply site user, and a human operator of an input device 326 at a planning center 30 may be referred to herein as a planning center user. The input devices 326 may be, comprise, or be implemented by a keyboard, a mouse, a touchscreen, a track-pad, a trackball, a personal computer, a PDA device, a smartphone, and/or another type of computing device.

One or more output devices 328 may also be connected to the interface circuit 324. Each output device 328 may be, comprise, or be implemented by a display device (e.g., a liquid crystal display (LCD) or cathode ray tube display (CRT), among others), a printer, and/or a speaker, among other examples.

Instances of the computing system 300, or portions thereof (e.g., an input device 326 or an output device 328) may be associated with different, corresponding ones of the wellsites 10, the supply sites 20, and/or the planning centers 30. For example, an input device 326 may be associated with each wellsite 10, each supply site 20, and/or each optional planning center 30, and an output device 328 may be associated just with each planning center 30, or alternatively with one or more wellsites 10, one or more supply sites 20, and each planning center 30.

The computing system 300 may also comprise one or more mass storage devices 330 for storing machine-readable instructions and data. Examples of such mass storage devices 330 include hard disk drives, compact disk (CD) drives, digital versatile disk (DVD) drives, floppy disk drives, and/or USB and/or other flash drives, among other examples. The coded instructions 332 may be stored in the mass storage device 330, the volatile memory 318, the non-volatile memory 320, the local memory 314, and/or on a removable storage medium 334, such as a CD or DVD. Thus, the computing system 300 may be implemented in accordance with hardware (embodied in one or more chips including an integrated circuit, such as an ASIC), or may be implemented as software or firmware for execution by one or more processors, such as the processor 312. In the case of firmware or software, the embodiment may be provided as a computer program product including a computer-readable medium or storage structure embodying computer program code (e.g., software or firmware) thereon for execution by the processor 312.

Systems according to the disclosure can include one or more instances of the computing system 300 (or portions thereof), one or more pieces of equipment that is used to attain the goals of the plurality of wellsites 10 (such as the transportation equipment 50 and the equipment of the wellsite system 100), and optionally a plurality of sensors associated with such equipment. The sensors may collect data regarding operational status and/or maintenance status of the pieces of equipment with which they are associated. The sensors may transmit data, whether wirelessly (e.g., via Bluetooth, radio-frequency identification (RFID), wireless local area networking (WLAN), or the like) or through a wired connection, e.g., to be used as wellsite inputs, which can be accomplished automatically (i.e., without further human intervention) or by intervention of a user. If a user intervenes, the user may manually compile data from the/ each sensor(s) and also manually input that data to or through the computing system as a wellsite input, or the/ each sensor may automatically compile its own data such that the user just manually inputs that data.

Figure 4:
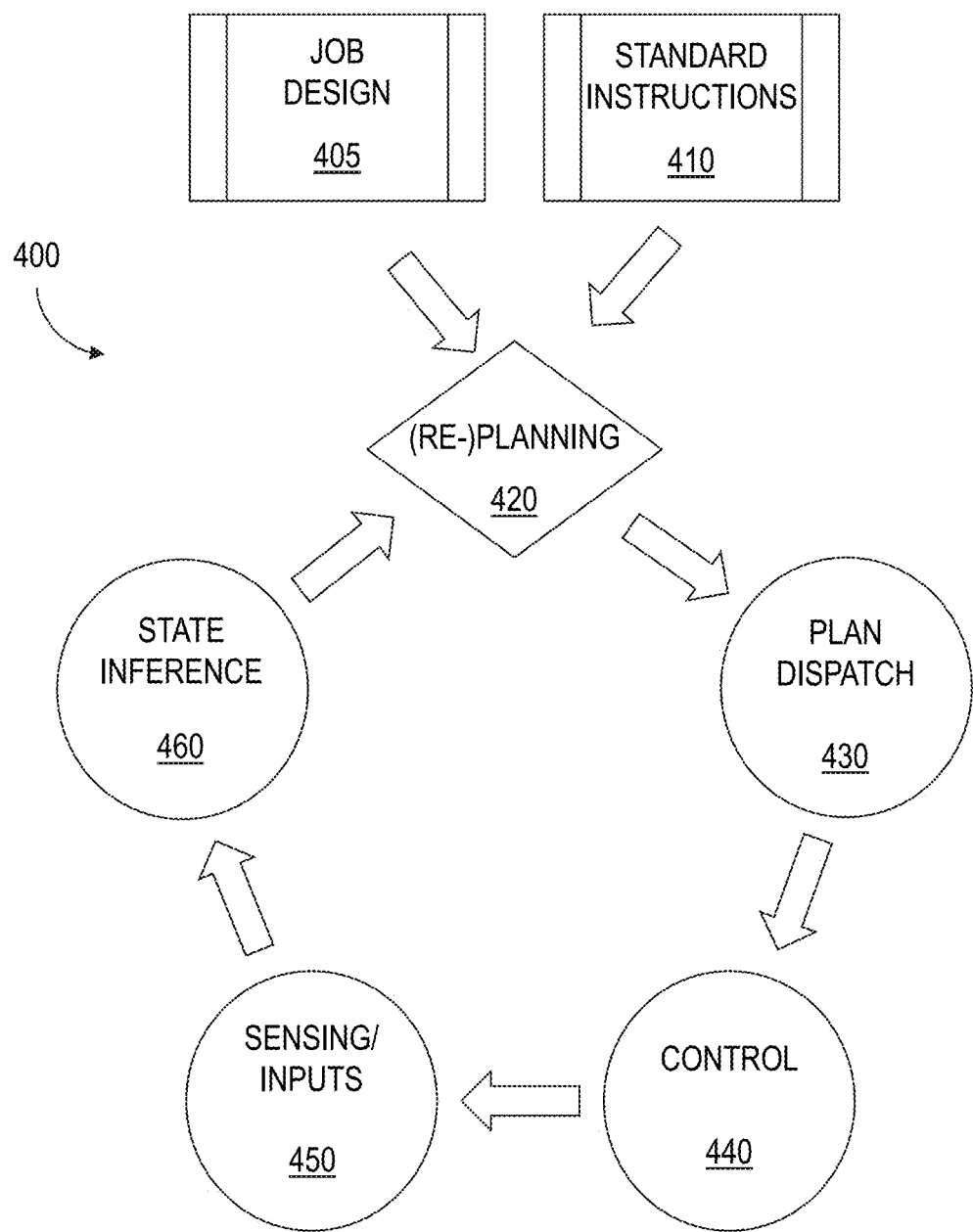
FIG. 4 is a flow-chart diagram of at least a portion of an example implementation of a method according to one or more aspects of the present disclosure.

FIG. 4 is a flow-chart diagram of at least a portion of an example implementation of a regressive operational method 400 according to one or more aspects of the present disclosure. For example, the operational method 400 may describe attaining increased or maximal operational efficiency in an operational network, such as the example network 5 depicted in FIG. 1. The operational method 400 may utilize a set of parameters or inputs relating to particular operations to be performed at the plurality of wellsites 10 in the operational network 5, as well as wellsite goals (e.g., resource production goals), which are captured in job design 405. The operational method 400 may additionally utilize a set of operational requirements or tasks related to the goals of the plurality of wellsites 10, which are captured in standard instructions 410. Both job design information 405 and standard instructions information 410 may be provided as (wellsite and/or supply site) inputs to a planning stage 420. In the planning stage 420, an initial detailed plan may be generated based on the wellsite and supply site inputs. The initial detailed plan can be reevaluated during a re-planning stage (depicted in FIG. 4 in combination with the planning stage 420) whenever there is (or when the system receives) a new or updated input. After a plan is made or re-planned in stage 420, it becomes a current detailed plan. Each current detailed plan can be expressed (e.g., output) as a schedule of actions and corresponding times at which the actions are to be taken. This schedule is provided to a user at a plan dispatch stage 430, at which point the user/ dispatcher stewards (to the extent that the action can be automated) and/or directly accomplishes (to the extent that the action cannot be automated) each action at or by its corresponding time. This plan dispatch stage 430 may include a user tasking one or more controllers (e.g., hardware controllers, such as, but not limited to, the controller 161 of the control center 160 shown in FIG. 2) to perform or to ensure performance of one or more of the actions (e.g., when prescribed conditions and/or preconditions are met). In some implementations, a control stage 440 may include one or more controllers (e.g., hardware controllers, such as the controller 161) being tasked (e.g., automatically, without user intervention) to perform or to ensure performance of one or more of the actions (e.g., when prescribed conditions and/or preconditions are met). Sensors may be used to collect (and/or transmit) information in an optional sensing stage 450, e.g., regarding performance of one or more of the actions in the plan/schedule. If such sensors are present, the raw information collected by the sensors may be aggregated and analyzed in a state inference stage 460 (which is also, therefore, optional). Either in the optional state inference stage 460, or as an initial part of a re-planning stage 420, measurements, observed status, and other inputs may be automatically or manually entered (input into the computer system). The inputs may then be analyzed to validate or update the current detailed plan, and the regressive method 400 can continue repeatedly.

The job design information 405 and/or the standard instructions information 410 may include or contain historical information regarding this wellsite network 5 and/or regarding operations identical or similar to operations to be performed by one or more wellsites 10 in the wellsite network 5. Additionally, or alternatively, either the job design information 405 or the standard instructions information 410 can include or contain an operational file. The operational file can contain operational data about each of the available actions in the domain for which the planning is being carried out, such as the example involving proppant supply to fracturing operations at one or more wellsites 10. The operational file may be set out in a PDDL (Planning Domain Definition Language)-based language and may contain definitions of the environment in which the operation is taking place, in a manner known to those skilled in the art of planning domain definition. This PDDL-based model of the domain may contain a deterministic model of the behavior of systems and equipment in the domain, under an assumption of complete knowledge of an initial state of the system and domain prior to plan execution. This deterministic definition can mean that, for known initial states and known inputs, repeatable output states can be repeatably achieved, with little or no randomness involved, so that outcomes can therefore be as predictable as possible.

Many of the execution conditions that affect success or failure of the execution of an action are external to the PDDL planning domain model. For example, in supply chain operations for a fracturing wellsite, traffic delays and delays in loading or unloading of proppant can result in considerable NPT, but the necessary sensing actions or reporting of truck location are not captured in the domain description because it just describes deterministic behavior, without uncertainty. An operations planner can use an abstract model of how a plan should interact with the world, and execution failures can be expected unless the gap between the PDDL model and the sensed world is bridged. An operational file can help achieve this and, thus, may be used to supplement other inputs relating to given operations.

Whether additionally or alternatively to using a PDDL planning domain model, answer set programming (ASP) may be utilized for modeling operations. ASP is a declarative programming technique that makes use of causal and clausal statements. ASP permits a focus on modeling a complex problem instead of on solutions, which facilitates optimizations as well as just improvements in addressing complex problems.

Figure 5:
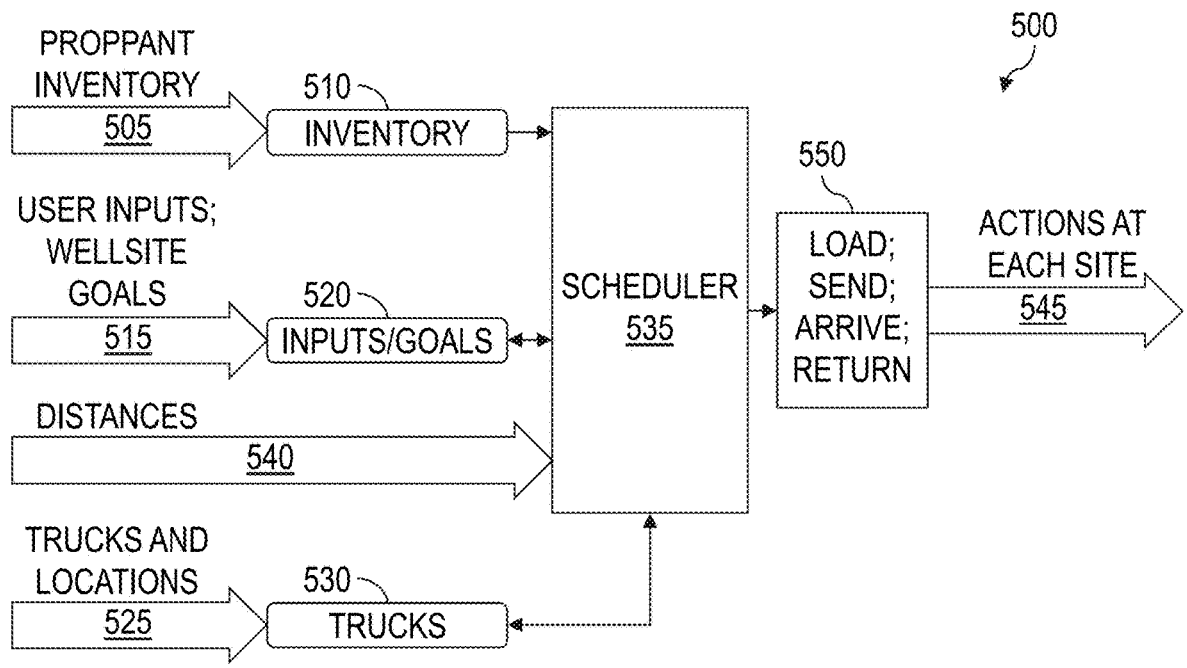
FIG. 5 is a flow-chart diagram of at least a portion of an example implementation of a method according to one or more aspects of the present disclosure.

In implementations in which network operations become exceedingly complex, multiple domains may be utilized instead of a single domain for inputs, historical information, operational requirements, etc. For example, FIG. 5 is a flow-chart diagram of at least a portion of an example implementation of a method 500 according to one or more aspects of the present disclosure, including multiple domains for a network 5 in which one or more wellsites 10 are planned to undertake fracturing operations. Proppant inventory information is input 505 into an inventory domain 510, user inputs and wellsite goals are input 515 into an inputs/goals domain 520, and information regarding supply trucks and their corresponding locations are input 525 into a trucks domain 530. A scheduler 535, which may comprise or be a non-transitory, computer-readable medium, a computer system containing the non-transitory, computer-readable medium, or another implementation of a method according to one or more aspects of the present disclosure, utilizes the inputs 505, 515, 525 from the domains 510, 520, 530, as well as inputs 540 regarding distances between the wellsites 10, the supply sites 20, and the supply trucks 40, to generate a current detailed plan, which can be expressed/output 545 as a schedule containing actions and times. Among these actions/times, the output schedule 545 may include instructions 550 to load proppant, instructions to send trucks to a location, information on when/whether a truck has arrived at a location, and instructions to have trucks return to a neutral site or to another site. The schedule can include, or be annotated with, operational information. The plan may be alternatively expressed/output 545 as a list of actions to be accomplished at each wellsite and/or supply site location.

Figure 6:
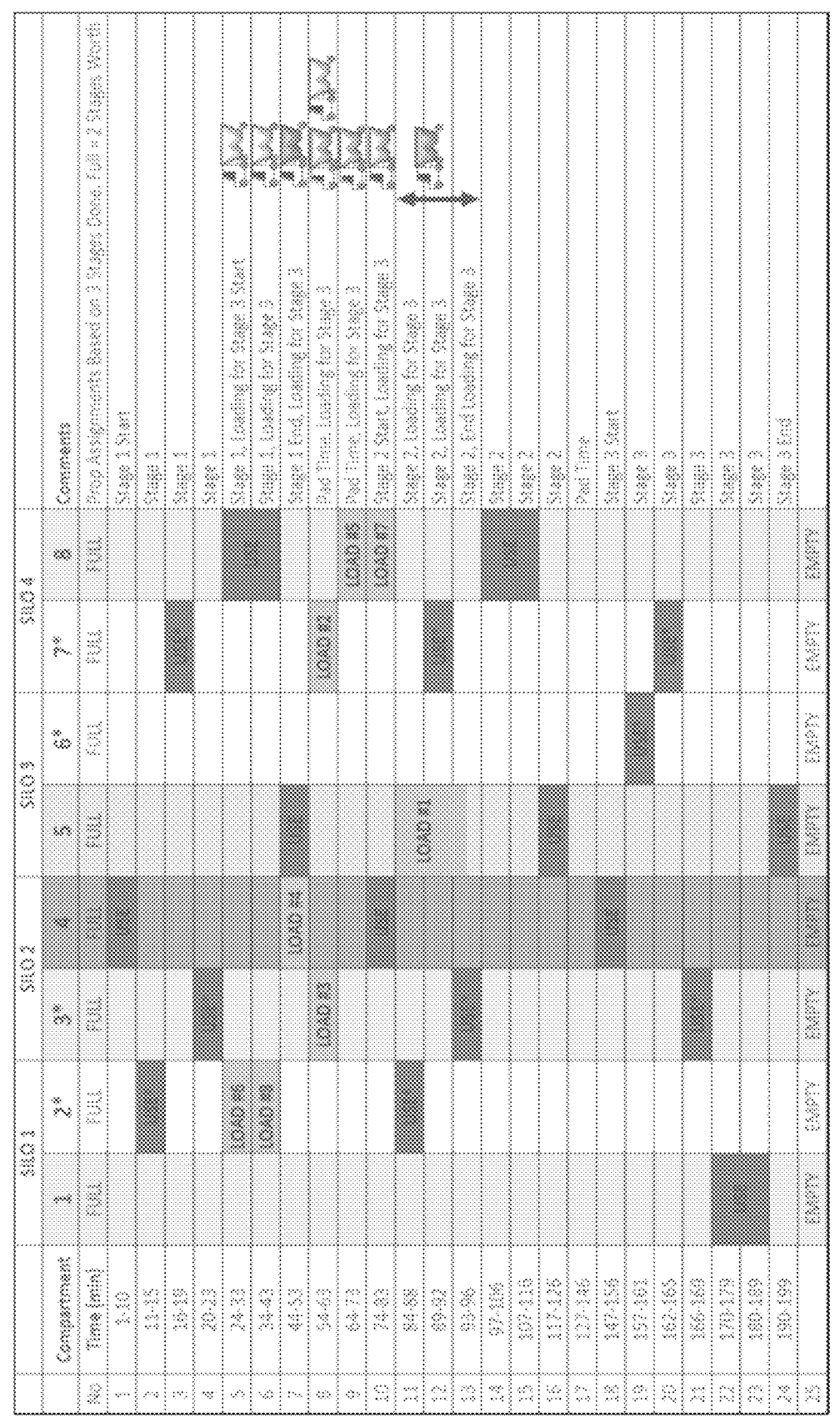

An example schedule output of the planning/re-planning stage 420 from FIG. 4 or of the scheduler 535 from FIG. 5 can be seen in FIG. 6. The schedule shown in FIG. 6 shows a supply chain containing four supply sites (silos), with loading actions to be undertaken for each supply site (silo) at their corresponding times, based on wellsite network need (not shown).

Figure 7:
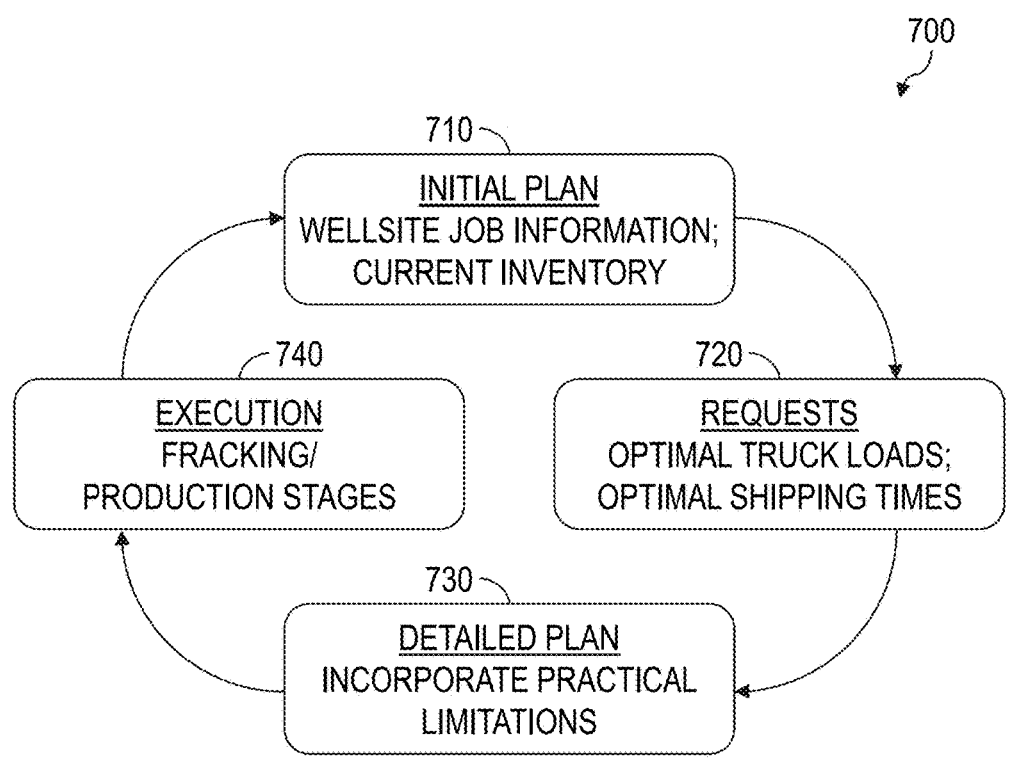
FIG. 7 is a flow-chart diagram of at least a portion of an example implementation of a method according to one or more aspects of the present disclosure.

FIG. 7 is a flow-chart diagram of at least a portion of an example implementation of a cyclic operational method 700 according to one or more aspects of the present disclosure. Based on inputs/information relating to wellsite goals/tasks (e.g., related to resource production "jobs") and/or supply site inputs such as current supply inventory, an initial plan can be generated 710. Each current detailed plan can be expressed (e.g., output) as a schedule of actions and corresponding times at which the actions are to be taken. These actions or this schedule can inform 720 a user/dispatcher regarding increased operational efficiency based on improved/optimal supply truck loads/routes and on improved/optimal supply shipping times, to attain the goals of the initial plan. At this point, practical limitations can be introduced, which can represent unexpected issues and/or other circumstances that can push shipping loads and/or times off optimal. This can, if disruptive enough, cause a reanalysis of the initial plan to form 730 a detailed plan (or a validation of the initial plan with detailed information regarding practical considerations). The detailed plan can be expressed/output as a schedule, which can be used as a guide for executing 740 the detailed plan through the operational stage(s) (e.g., of production, fracking, etc.) to attain the aggregate goals of the wellsite network. Additional inputs can be provided and/or previous inputs can include updated information, which can then be analyzed to validate or update the detailed plan, and the cyclic method can continue repeatedly.

Figure 8:
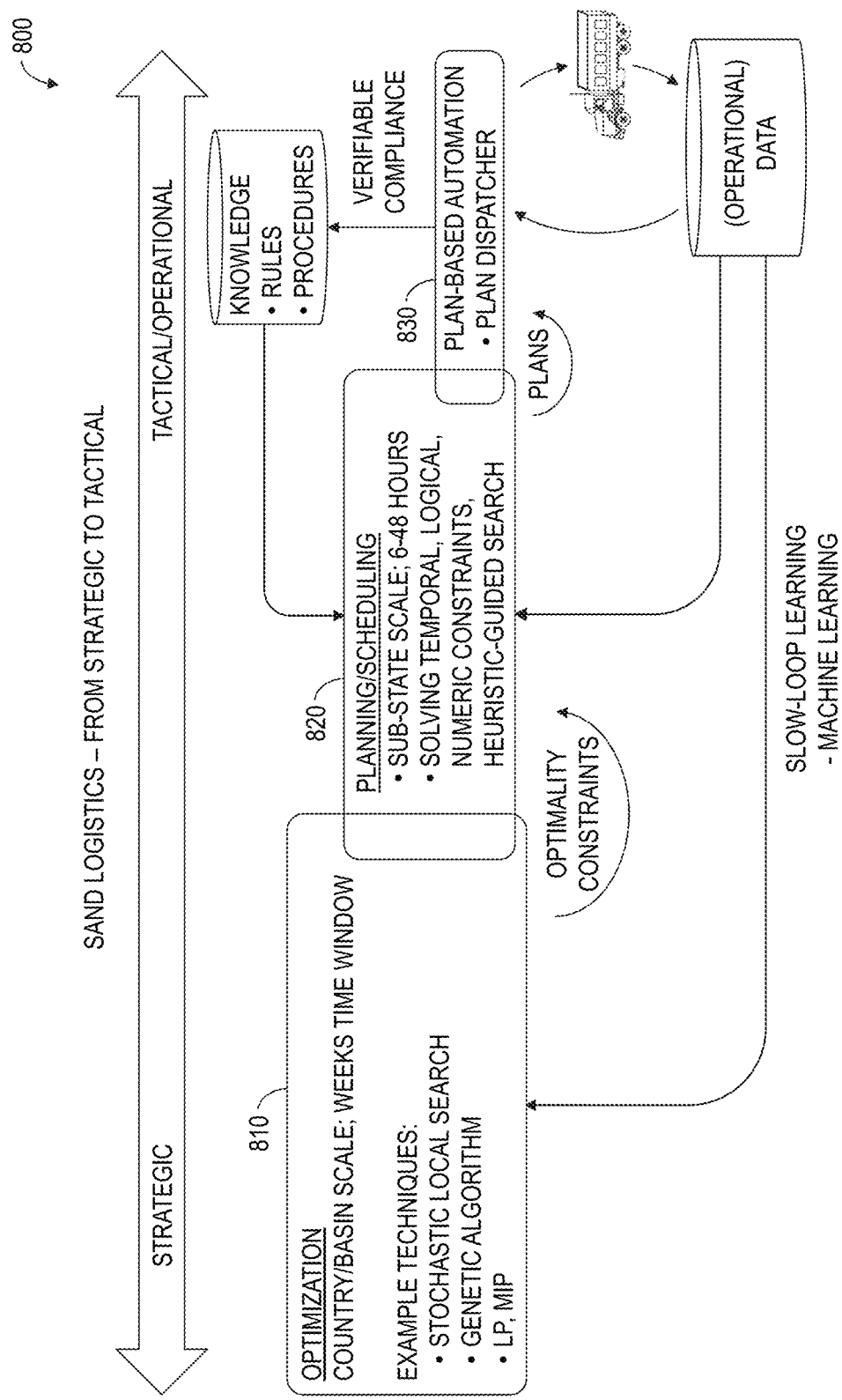
FIG. 8 is a flow-chart diagram of at least a portion of an example implementation of a method according to one or more aspects of the present disclosure.

One or more aspects described above may also be utilized in combination with a slower-loop optimization algorithm, which may give the planner useful constraints for where to look for the tactical plans. That is, the tactical plans may close to an optimum solution, but such combination may aid the planner in finding plans faster (e.g., due to a smaller space in which to search). For example, FIG. 8 is a flowchart diagram of at least a portion of an example implementation of such method 800 according to one or more aspects of the present disclosure, diagram a slow optimization loop 810, a medium planning/scheduling loop 820, and a fast operational control loop 830. To run manage such operation efficiently and economically, an optimization approach may be used for a three-week (among other examples) time horizon moving window. This may aid in deciding where to source the consumable materials, where and how to transport the material near the place of consumption (i.e., the wellsites), and what quantity of the material to allocate to each consumption location. The slow loop may afford sufficient time to determine an optimal solution. The decisions from that level may be cascaded down to the more tactical and regional level of planning. Planning the material delivery operations may be performed for the moving window of up to 24 hours (among other examples). The decisions made in the slow loop may serve as constraints for the tactical planning and may be employed by the planning algorithm to reduce the size of the space in which the solution is sought. This may improve the speed of the planning process.

In view of the entirety of the present disclosure, including the figures and the claims, a person having ordinary skill in the art will readily recognize that the present disclosure introduces a method comprising generating a current detailed plan comprising a plurality of actions to be taken and a corresponding time for each action to be taken with regard to a plurality of wellsites that utilize supplies from a plurality of supply sites remote from the wellsites, wherein: the detailed plan minimizes aggregate NPT for the wellsites within constraints of wellsite inputs and supply site inputs; the supplies comprise materials utilized for fracturing operations conducted at the wellsites; the actions are based on location of each of a plurality of transportation equipment for transporting the supplies from the supply sites to the wellsites, distance of each transportation equipment from one of the supply sites and/or one of the wellsites, loading time for the supplies at one of the supply sites, and unloading time for the supplies at one of the wellsites; and the actions comprise a schedule of inventory actions and corresponding times at which a specific quantity and a specific type of each of the supplies is to be ordered from a distributor.

The wellsite inputs may relate to status of each wellsite, user- and/or task-defined goals for each wellsite, and rate of consumption of supplies to be utilized to attain the goals for each wellsite, and the supply site inputs may relate to inventory of supplies at each supply site, logistics of supply chain between each supply site and each wellsite, and logistics of re-supply of supplies to each supply site.

After generation of an initial detailed plan, each wellsite input and/or each supply site input may either validate the current detailed plan without changes or cause one or more changes to replace the current detailed plan.

The current detailed plan may minimize aggregate operating costs for the wellsites and the supply sites within constraints of the wellsite inputs and the supply site inputs. The current detailed plan may also or instead maximize aggregate resource production at the websites within constraints of the wellsite inputs and the supply site inputs.

The wellsite inputs may be stored in and provided by one or more wellsite module communication devices that are physically separate from one or more supply site module communication devices in which the supply site inputs are stored or input and from which the supply site inputs are provided. The current detailed plan may be generated via at least one planning center module communication device, such that the actions and corresponding times may be itemized for being stewarded and/or accomplished by a planning center user via the at least one planning center module communication device. Each planning center module communication device may be physically separate from the wellsites and the supply sites.

The wellsite inputs and supply site inputs may comprise historical information about operation, goals, and logistics involving the wellsites and the supply sites, and generating the current detailed plan may include dynamic prioritization of certain actions to attain certain goals without allocation of weighting amongst inputs being entered by a user.

The actions may comprise a schedule of dispatch actions and corresponding times at which a specific transportation equipment is to be sent to a specific wellsite or supply site to load or unload a specific one of the materials.

The actions may comprise a schedule of dispatch actions and corresponding times at which a specific transportation equipment is to be held at a specific wellsite or supply site or to be returned to a neutral site, awaiting instruction to load, unload, or move to another wellsite, supply site, or neutral site.

At least one of the wellsite inputs and supply site inputs utilized for generating the current detailed plan may be remotely sensed and automatically provided.

At least one of the wellsite inputs and supply site inputs utilized for generating the current detailed plan may be provided by a user based on observation.

The current detailed plan may comprise a schedule on which operational constraints are annotated by or associated with the plurality of actions to be taken at their corresponding times.

The goals for each wellsite may comprise and/or be associated with: a list of equipment to be utilized to attain the goals for the wellsite; a list of personnel to be utilized to attain the goals for the wellsite; and/or a list of tasks to be completed, and an order in which they are to be completed, to attain the goals for the wellsite. At least some of the goals comprising and/or associated with the equipment list, the personnel list, and/or the task list may involve consultation of historical information about operation, goals, and/or logistics involving the wellsites.

The inputs relating to the status of each wellsite may further comprise: operational status for each piece of equipment used to attain the goals for the wellsite; maintenance status for each piece of equipment used to attain the goals for the wellsite; and/or an estimation of time, manpower, and parts to be utilized to convert a non-operational piece of equipment having no operational status or a failure condition in maintenance status into an operational piece of equipment having an operational status or a non-failure condition in maintenance status. Other inputs may include: a list of pieces of available equipment that are involved in attaining the goals for each wellsite and of supplies available at each supply site, or otherwise attainable through a distributor, that are involved in attaining the goals for each wellsite; a current location for each piece of available equipment and each supply in the list; and/or an intended length of time over which the current detailed plan is to be implemented and across which aggregate NPT for the plurality of wellsites is to be minimized. At least a portion of the wellsite and/or supply site inputs may comprise one or more preconditions to be met in order for one or more tasks from the list of tasks to be completed. At least a portion of the wellsite and/or supply inputs may comprise one or more causal effects of failure of either one or more of the preconditions or one or more of the tasks themselves, thereby permitting dynamic prioritization of certain tasks and/or certain actions to attain certain goals, without allocation of weighting amongst inputs being entered by a user.

The present disclosure also introduces a method comprising operating a plurality of wellsites that utilize supplies from a plurality of supply sites remote from the plurality of wellsites, including: for each wellsite, providing wellsite inputs relating to status of the wellsite, user- and/or task-defined goals for the wellsite, and/or rate of consumption of supplies to be utilized to attain the goals for the wellsite; for each supply site, providing supply site inputs relating to inventory of supplies, logistics of supply chain between the supply site and each wellsite, and/or logistics of re-supply of supplies to the supply site; based on the wellsite inputs and the supply site inputs, generating a current detailed plan comprising a plurality of actions to be taken and a corresponding time for each action to be taken, wherein the detailed plan minimizes aggregate NPT for the plurality of wellsites, within constraints of the wellsite inputs and the supply site inputs; and providing the current detailed plan as a schedule to permit stewarding or accomplishment of each action at each corresponding time; wherein, after generation of an initial detailed plan, each wellsite input and/or each supply site input either validates the current detailed plan without changes or causes one or more changes to replace the current detailed plan.

The current detailed plan may further: minimize aggregate operating costs for both the plurality of wellsites and the plurality of supply sites, within constraints of the wellsite inputs and the supply site inputs; and/or maximize aggregate resource production at the plurality of websites, within constraints of the wellsite inputs and the supply site inputs.

The wellsite inputs may be stored in and provided by one or more wellsite module communication devices that are physically separate from one or more supply site module communication devices in which the supply site inputs are stored or input and from which the supply site inputs are provided. The current detailed plan may be provided via at least one planning center module communication device, such that the plurality of actions to be taken and corresponding times for each action to be taken may be itemized for being stewarded and/or accomplished by a planning center user via the at least one planning center module communication device. Each planning center module communication device may be physically separate from both the plurality of wellsites and the plurality of supply sites. The current detailed plan may be provided via at least one wellsite module communication device and via at least one supply site module communication device, such that the plurality of actions to be taken and corresponding times for each action to be taken may be itemized for being stewarded and/or accomplished by a wellsite user via the at least one wellsite module communication device or by a supply site user via the at least one supply site module communication device.

The wellsite inputs and supply site inputs may comprise historical information about operation, goals, and logistics involving the plurality of wellsites and the plurality of supply sites, and generating the current detailed plan may include dynamic prioritization of certain actions to attain certain goals without allocation of weighting amongst inputs being entered by a user.

The plurality of wellsites may comprise one or more wellsites at which fracturing operations are to be conducted, the supplies may comprise one or more types of proppant, an input for each wellsite at which fracturing operations are to be conducted may comprise a type of proppant to be used, and the logistics of supply chain may comprise location of a plurality of transportation equipment for shipping the supplies, distance of each of the plurality of transportation equipment from the supply site and/or from the wellsite, loading time for the supplies at a supply site, and unloading time for the supplies at a wellsite. The plurality of actions may comprise a schedule of dispatch actions and corresponding times at which a specific transportation equipment is to be sent to a specific site to load or unload a specific type of proppant. The plurality of actions may comprise a schedule of dispatch actions and corresponding times at which a specific transportation equipment is to be held at a specific site or to be returned to a neutral site, awaiting instruction to load, unload, or move to another specific site. The plurality of actions may comprise a schedule of inventory actions and corresponding times at which a specific quantity and a specific type of proppant is to be ordered from a distributor.

At least one of the wellsite inputs and supply site inputs for generating the current detailed plan may be remotely sensed and automatically provided. At least one of the wellsite inputs and supply site inputs for generating the current detailed plan may be provided by a user based on observation.

The current detailed plan may comprise a schedule on which operational constraints are annotated by or associated with the plurality of actions to be taken at their corresponding times.

The inputs relating to the status of the wellsite may comprise a percentage completion of the user- or task-defined goals for the wellsite and a parameter relating the rate of consumption of the supplies to be utilized to attain the goals for the wellsite to a speed of attainment of the goals for the wellsite. In such implementations, among others within the scope of the present disclosure, the inputs relating to the status of the wellsite may not comprise detailed information on equipment or personnel to be utilized, nor on specific tasks to be completed, to attain the goals for the wellsite.

The goals for the wellsite may comprise and/or be associated with: a list of equipment for attaining the goals for the wellsite; a list of personnel for attaining the goals for the wellsite; and/or a list of tasks to be completed, and an order in which they are to be completed, to attain the goals for the wellsite. At least some of the goals comprising and/or associated with the equipment list, the personnel list, and/or the task list may involve consultation of historical information about operation, goals, and/or logistics involving the plurality of wellsites.

The inputs relating to the status of each wellsite may further comprise: operational status for each piece of equipment used to attain the goals for the wellsite; maintenance status for each piece of equipment used to attain the goals for the wellsite; and an estimation of time, manpower, and parts for converting a non-operational piece of equipment having no operational status or a failure condition in maintenance status into an operational piece of equipment having an operational status or a non-failure condition in maintenance status. The inputs may further comprise: a list of pieces of available equipment that are involved in attaining the goals for each wellsite and of supplies available at each supply site, or otherwise attainable through a distributor, that are involved in attaining the goals for each wellsite; a current location for each piece of available equipment and each supply in the list; and/or an intended length of time over which the current detailed plan is to be implemented and across which aggregate NPT for the plurality of wellsites is to be minimized.

At least a portion of the wellsite and/or supply site inputs may comprise one or more preconditions to be met in order for one or more tasks from the list of tasks to be completed. At least a portion of the wellsite and/or supply inputs may comprise one or more causal effects of failure of either one or more of the preconditions or one or more of the tasks themselves, thereby permitting dynamic prioritization of certain tasks and/or certain actions to attain certain goals, without allocation of weighting amongst inputs being entered by a user.

The present disclosure also introduces an apparatus comprising a computing system comprising one or more processors and a memory system comprising one or more non-transitory, computer-readable media storing instructions that, when executed by at least one of the one or more processors, cause the computing system to perform operations comprising: for each of a plurality of wellsites, providing wellsite inputs relating to status of the wellsite, to user- or task-defined goals for the wellsite, and to rate of consumption of supplies for attaining the goals for the wellsite; for each of a plurality of supply sites remote from the plurality of wellsites, providing supply site inputs relating to inventory of supplies, logistics of supply chain between the supply site and each wellsite, and to logistics of re-supply of supplies to the supply site; based on the wellsite inputs and the supply site inputs, generating a current detailed plan comprising a plurality of actions to be taken and of a corresponding time for each action to be taken, wherein the detailed plan minimizes aggregate NPT for the plurality of wellsites, within constraints of the wellsite inputs and the supply site inputs; and providing the current detailed plan as an output to the one or more processors, for display as a schedule to permit stewarding or accomplishment of each action at each corresponding time; wherein, after generation of an initial detailed plan, each wellsite input and/or each supply site input either validates the current detailed plan without changes or causes one or more changes to replace the current detailed plan, which is then output for display to a user via the one or more processors.

The apparatus may comprise one or more wellsite module communication devices, each associated with or located at one or more wellsites, and one or more supply site module communication devices, each associated with or located at one or more supply sites.

The current detailed plan may minimize aggregate operating costs for both the plurality of wellsites and the plurality of supply sites, within constraints of the wellsite inputs and the supply site inputs.

The current detailed plan may maximize aggregate resource production at the plurality of websites, within constraints of the wellsite inputs and the supply site inputs.

The plurality of wellsites may comprise one or more wellsites at which fracturing operations are to be conducted, the supplies may comprise one or more types of proppant, and an input for each wellsite at which fracturing operations are to be conducted may comprise a type of proppant to be used.

At least one of the wellsite inputs and supply site inputs for generating the current detailed plan may be remotely sensed and automatically provided, and at least one of the wellsite inputs and supply site inputs for generating the current detailed plan may be provided by a user based on observation.

The inputs relating to the status of each wellsite may comprise a percentage completion of the user- or task-defined goals for the wellsite and a parameter relating the rate of consumption of the supplies utilized to attain the goals for the wellsite to a speed of attainment of the goals for the wellsite. In such implementations, among others within the scope of the present disclosure, the inputs relating to the status of the wellsite may not comprise detailed information on equipment or personnel to be utilized, nor on specific tasks to be completed, to attain the goals for the wellsite.

The goals for each wellsite may comprise and/or be associated with: a list of equipment to be utilized to attain the goals for the wellsite; a list of personnel to be utilized to attain the goals for the wellsite; and/or a list of tasks to be completed, and an order in which they are to be completed, to attain the goals for the wellsite. At least some of which may involve consultation of historical information about operation, goals, and logistics involving the plurality of wellsites.

The inputs relating to the status of each wellsite may further comprise: operational status for each piece of equipment used to attain the goals for the wellsite; maintenance status for each piece of equipment used to attain the goals for the wellsite; and/or an estimation of time, manpower, and parts for converting a non-operational piece of equipment having no operational status or a failure condition in maintenance status into an operational piece of equipment having an operational status or a non-failure condition in maintenance status. The inputs may further comprise: a list of pieces of available equipment that are involved in attaining the goals for each wellsite and of supplies available at each supply site, or otherwise attainable through a distributor, that are involved in attaining the goals for each wellsite; a current location for each piece of available equipment and each supply in the list; and an intended length of time over which the current detailed plan is to be implemented and across which aggregate NPT for the plurality of wellsites is to be minimized.

At least a portion of the wellsite and/or supply site inputs may comprise one or more preconditions to be met in order for one or more tasks from the list of tasks to be completed. At least a portion of the wellsite and/or supply inputs may comprise one or more causal effects of failure of either one or more of the preconditions or one or more of the tasks themselves, thereby permitting dynamic prioritization of certain tasks and/or certain actions to attain certain goals, without allocation of weighting amongst inputs being entered by a user.

The apparatus may further comprise a plurality of sensors associated with pieces of equipment on the list of equipment that are being used to attain the goals of the wellsites. The sensors may be configured to collect data regarding operational status of one or more pieces of equipment. The data collected by the sensors may be converted to wellsite inputs, either automatically or by intervention of a user.

The present disclosure also introduces a computer program product comprising a non-transitory, computer-readable medium storing instructions that, when executed by at least one processor of a computing system, cause the computing system to perform operations comprising: for each of a plurality of wellsites, providing wellsite inputs relating to status of the wellsite, to user- or task-defined goals for the wellsite, and to rate of consumption of supplies utilized to attain the goals for the wellsite; for each of a plurality of supply sites remote from the plurality of wellsites, providing supply site inputs relating to inventory of supplies, logistics of supply chain between the supply site and each wellsite, and to logistics of re-supply of supplies to the supply site; based on the wellsite inputs and the supply site inputs, generating a current detailed plan comprising a plurality of actions to be taken and of a corresponding time for each action to be taken, wherein the detailed plan minimizes aggregate NPT for the plurality of wellsites, within constraints of the wellsite inputs and the supply site inputs; and providing the current detailed plan as an output to the one or more processors, for display as a schedule to permit stewarding or accomplishment of each action at each corresponding time. After generation of an initial detailed plan, each wellsite input and/or each supply site input may either validate the current detailed plan without changes or cause one or more changes to replace the current detailed plan, which may then be output for display to a user via the one or more processors.

The current detailed plan may minimize aggregate operating costs for both the plurality of wellsites and the plurality of supply sites, within constraints of the wellsite inputs and the supply site inputs. The current detailed plan may also or instead maximize aggregate resource production at the plurality of websites, within constraints of the wellsite inputs and the supply site inputs.

The plurality of wellsites may comprise one or more wellsites at which fracturing operations are to be conducted, the supplies may comprise one or more types of proppant and/or other materials utilized for the fracturing operations, and an input for each wellsite at which fracturing operations are to be conducted comprises a type of the proppant and/or other materials to be utilized for the fracturing operations.

At least one of the wellsite inputs and supply site inputs for generating the current detailed plan may be remotely sensed and automatically provided, and/or at least one of the wellsite inputs and supply site inputs for generating the current detailed plan may be provided by a user based on observation.

The inputs relating to the status of each wellsite may comprise a percentage completion of the user- or task-defined goals for the wellsite and/or a parameter relating the rate of consumption of the supplies utilized to attain the goals for the wellsite to a speed of attainment of the goals for the wellsite. In such implementations, among others within the scope of the present disclosure, the inputs relating to the status of the wellsite may not comprise detailed information on equipment or personnel to be utilized, nor on specific tasks to be completed, to attain the goals for the wellsite.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
    operating a plurality of wellsites that utilize supplies from a plurality of supply sites remote from the plurality of wellsites, including:
        for each wellsite, providing wellsite inputs relating to operational status of equipment of the wellsite, maintenance status of the equipment of the wellsite, goals for the wellsite, and rate of consumption of supplies utilized to attain the goals for the wellsite, wherein the goals for the wellsite comprise a list of equipment to be utilized to attain the goals for the wellsite, a list of personnel to be utilized to attain the goals for the wellsite, and a list of tasks to be completed, and an order in which the tasks are to be completed, to attain the goals for the wellsite;
        for each supply site, providing supply site inputs relating to inventory of supplies, logistics of supply chain between the supply site and each wellsite, and logistics of re-supply of supplies to the supply site;
        based on the wellsite inputs and the supply site inputs, generating a current detailed plan comprising a plurality of actions to be taken and a corresponding time for each action to be taken, wherein the current detailed plan minimizes aggregate non-productive time (NPT) for the plurality of wellsites, within constraints of the wellsite inputs and the supply site inputs; and
        providing the current detailed plan as a schedule to permit stewarding or accomplishment of each action at each corresponding time;
    delivering supplies to the wellsites utilizing the current detailed plan;
    performing a fracturing operation with the delivered supplies at the wellsites, the fracturing operation performed by operational equipment of at least one wellsite and controlled by a wellsite controller;
    using information obtained and transmitted by a plurality of sensors associated with the operational equipment of the at least one wellsite to determine and update, if applicable, the operational status and the maintenance status of the operational equipment as at least part of the wellsite inputs; and
    after generation of an initial detailed plan, analyzing each wellsite input and/or each supply site input, utilizing a cyclic regressive method, to either validate the current detailed plan without changes or cause one or more changes to replace the current detailed plan with an updated plan if a wellsite input is updated, the cyclic regressive method utilizing a slow optimization loop, wherein the decisions from the slow optimization loop are cascaded to a medium planning/scheduling loop, and to a fast operational control loop; and
    automatically controlling, via the wellsite controller, the operational equipment of the at least one wellsite to move, mix, separate, pressurize, or measure fluids, materials, or mixtures and to inject the fluids, the materials, or the mixtures into a wellbore at the wellsite to perform the fracturing operation in conjunction with the current detailed plan or the updated plan, wherein automatically controlling, via the wellsite controller, the operational equipment of the at least one wellsite comprises providing as an input a type of proppant of a plurality of types of proppant to be used as the materials as well as a rate of the proppant to be used as selected to correspond to the fracturing operation at the at least one wellsite to facilitate resource production at the at least one wellsite.

2. The method of claim 1 wherein at least some of the goals comprising or associated with the list of equipment, the list of personnel, or the list of tasks are based on historical information pertaining to operation, goals, or logistics involving the plurality of wellsites.

3. The method of claim 1 wherein the current detailed plan:
- minimizes aggregate operating costs for the wellsites and the supply sites within constraints of the wellsite inputs and the supply site inputs; and
- maximizes aggregate resource production at the wellsites within constraints of the wellsite inputs and the supply site inputs.

4. The method of claim 1 wherein the wellsite inputs are stored in and provided by one or more wellsite module communication devices that are physically separate from one or more supply site module communication devices in which the supply site inputs are stored or input and from which the supply site inputs are provided.

5. The method of claim 4 wherein the current detailed plan is generated via at least one planning center module communication device, such that the actions and corresponding times are itemized for being stewarded and/or accomplished by a planning center user via the at least one planning center module communication device.

6. The method of claim 5 wherein each planning center module communication device is physically separate from the wellsites and the supply sites.

7. The method of claim 1 wherein the wellsite inputs and supply site inputs comprise historical information about operation, goals, and logistics involving the wellsites and the supply sites, and wherein generating the current detailed plan includes dynamic prioritization of certain actions to attain certain goals without allocation of weighting amongst inputs being entered by a user.

8. The method of claim 1 wherein the actions comprise a schedule of dispatch actions and corresponding times at which a specific transportation equipment is to be sent to a specific wellsite or supply site to unload or load, respectively, a specific one of the materials.

9. The method of claim 1 wherein the actions comprises a schedule of dispatch actions and corresponding times at which a specific transportation equipment is to be held at a specific wellsite or supply site or to be returned to a neutral site, awaiting instruction to load, unload, or move to another wellsite, supply site, or neutral site.

10. The method of claim 1 wherein at least one of the wellsite inputs and supply site inputs utilized for generating the current detailed plan is remotely sensed and automatically provided.

11. The method of claim 10 wherein at least one of the wellsite inputs and supply site inputs utilized for generating the current detailed plan is provided by a user based on observation.

12. The method of claim 1 wherein the wellsite inputs for each wellsite comprise an estimation of time, manpower, and parts for converting a non-operational piece of equipment having no operational status or a failure condition in maintenance status into an operational piece of equipment having an operational status or a non-failure condition in maintenance status.

13. The method of claim 1 wherein the wellsite inputs for each wellsite comprise:
- a list of pieces of available equipment that are involved in attaining the goals for that wellsite and of supplies available at each supply site, or otherwise attainable through a distributor, that are involved in attaining the goals for that wellsite; or
- a current location for each piece of available equipment and each supply in the list of pieces of available equipment.

14. The method of claim 1 wherein the wellsite inputs for each wellsite comprise an intended length of time over which the current detailed plan is to be implemented and across which aggregate NPT for the plurality of wellsites is to be minimized.

15. The method of claim 1 wherein the wellsite inputs comprise an input based on planning, execution, and/or completion of various tasks of the fracturing operation and/or other operations performed by the operational equipment of the at least one wellsite.

16. The method of claim 1 wherein generating the current detailed plan comprises utilizing a PDDL (Planning Domain Definition Language)-based model.

17. The method of claim 1 wherein generating the current detailed plan comprises utilizing an answer set programming (ASP)-based model.

18. The method of claim 1 wherein the information obtained and transmitted by a plurality of sensors is aggregated and analyzed in a state inference stage prior to determining and updating, if applicable, the operational status and the maintenance status of the operational equipment.

* * * * *